(12) United States Patent
Sukeno et al.

(10) Patent No.: US 9,830,722 B2
(45) Date of Patent: Nov. 28, 2017

(54) IMAGE PROCESSING DEVICE, DISPLAY DEVICE, IMAGE PROCESSING METHOD, DISPLAY METHOD, AND IMAGE PROCESSING PROGRAM

(71) Applicant: Mitsubishi Electric Corporation, Tokyo (JP)

(72) Inventors: Junji Sukeno, Tokyo (JP); Kazuhiko Yamada, Tokyo (JP); Nobuhiko Yamagishi, Tokyo (JP); Satoshi Minami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 209 days.

(21) Appl. No.: 14/409,415

(22) PCT Filed: Jun. 4, 2013

(86) PCT No.: PCT/JP2013/065450
§ 371 (c)(1),
(2) Date: Dec. 18, 2014

(87) PCT Pub. No.: WO2014/024553
PCT Pub. Date: Feb. 13, 2014

(65) Prior Publication Data
US 2015/0325019 A1    Nov. 12, 2015

(30) Foreign Application Priority Data

Aug. 10, 2012 (JP) .................................. 2012-178009

(51) Int. Cl.
*G09G 5/00* (2006.01)
*G06T 11/60* (2006.01)
(Continued)

(52) U.S. Cl.
CPC ................ *G06T 11/60* (2013.01); *G06T 3/40* (2013.01); *G09G 5/00* (2013.01); *G09G 5/026* (2013.01);
(Continued)

(58) Field of Classification Search
CPC . G06T 11/60; G06T 3/40; G06T 2207/10004; G09G 5/00; G09G 5/026;
(Continued)

(56) References Cited

U.S. PATENT DOCUMENTS 5,978,041 A   11/1999  Masuda et al.
6,879,728 B1   4/2005  Fisher et al.
(Continued)

FOREIGN PATENT DOCUMENTS

EP    2410740 A1   1/2012
JP    7-7685 A     1/1995
(Continued)

*Primary Examiner* — Abderrahim Merouan
(74) *Attorney, Agent, or Firm* — Birch, Stewart, Kolasch & Birch, LLP

(57) ABSTRACT

An image processing includes: a unit that calculates a feature amount of main image data; a unit that calculates a feature amount of sub image data or resized sub image data; an adjustment unit that performs image quality adjustment on the resized sub image data so that a difference between a feature amount of the adjusted sub image data and the feature amount of the main image data is smaller than a difference between the calculated feature amount of the sub image data and the feature amount of the main image data; and a unit that generates display image data from the main image data and adjusted sub image data according to display mode information. The sub image data include plural content items. The adjustment unit updates the feature amount of the main image data used in the adjustment, at the timing of change of the content item.

19 Claims, 16 Drawing Sheets

(51) Int. Cl.
*G06T 3/40* (2006.01)
*H04N 5/45* (2011.01)
*H04N 21/431* (2011.01)
*H04N 21/44* (2011.01)
*H04N 21/4402* (2011.01)
*G09G 5/02* (2006.01)
*H04N 21/443* (2011.01)
*G06F 3/0484* (2013.01)
*G06F 3/0485* (2013.01)
*G06F 3/0481* (2013.01)
*H04N 21/81* (2011.01)
*G09G 5/14* (2006.01)
*H04N 21/414* (2011.01)

(52) U.S. Cl.
CPC ........... *H04N 5/45* (2013.01); *H04N 21/4316* (2013.01); *H04N 21/4318* (2013.01); *H04N 21/44008* (2013.01); *H04N 21/44016* (2013.01); *H04N 21/4438* (2013.01); *H04N 21/440263* (2013.01); *H04N 21/8153* (2013.01); *G06F 3/0481* (2013.01); *G06F 3/0485* (2013.01); *G06F 3/04845* (2013.01); *G06F 3/04855* (2013.01); *G06F 2203/04806* (2013.01); *G06T 2207/10004* (2013.01); *G06T 2210/36* (2013.01); *G09G 5/14* (2013.01); *G09G 2320/0242* (2013.01); *G09G 2320/0271* (2013.01); *G09G 2320/103* (2013.01); *G09G 2340/0407* (2013.01); *G09G 2340/12* (2013.01); *G09G 2340/14* (2013.01); *G09G 2360/144* (2013.01); *G09G 2360/16* (2013.01); *H04N 21/41415* (2013.01); *H04N 21/812* (2013.01)

(58) Field of Classification Search
CPC .... G09G 5/14; G09G 2340/125; G09G 5/395; H04N 5/45; H04N 21/4316; H04N 21/4318; H04N 21/44008; H04N 21/44016; H04N 21/440263; H04N 21/4438; H04N 21/8153
See application file for complete search history.

(56) References Cited

U.S. PATENT DOCUMENTS

| 2006/0114265 | A1* | 6/2006 | Nishida | G09G 5/14 345/593 |
|---|---|---|---|---|
| 2008/0129877 | A1* | 6/2008 | Ohno | H04N 5/45 348/720 |
| 2008/0158392 | A1 | 7/2008 | Nikata | |
| 2011/0194756 | A1 | 8/2011 | Morifuji et al. | |
| 2012/0066713 | A1 | 3/2012 | Takada et al. | |
| 2012/0096344 | A1* | 4/2012 | Ho | G06F 17/211 715/249 |
| 2012/0274812 | A1* | 11/2012 | Gyotoku | H04N 5/23212 348/239 |
| 2012/0274813 | A1* | 11/2012 | Ishibashi | H04N 5/232 348/239 |

FOREIGN PATENT DOCUMENTS

| JP | 7-38820 A | 2/1995 |
|---|---|---|
| JP | 8-251503 A | 9/1996 |
| JP | 10-210383 A | 8/1998 |
| JP | 2006-154064 A | 6/2006 |
| JP | 2009-69613 A | 6/2006 |
| JP | 2009-105505 A | 5/2009 |
| JP | 2009-276702 A | 11/2009 |
| JP | 2011-203342 A | 10/2011 |
| JP | 2012-6453 A | 1/2012 |
| WO | WO 2011/004666 A1 | 1/2011 |

* cited by examiner

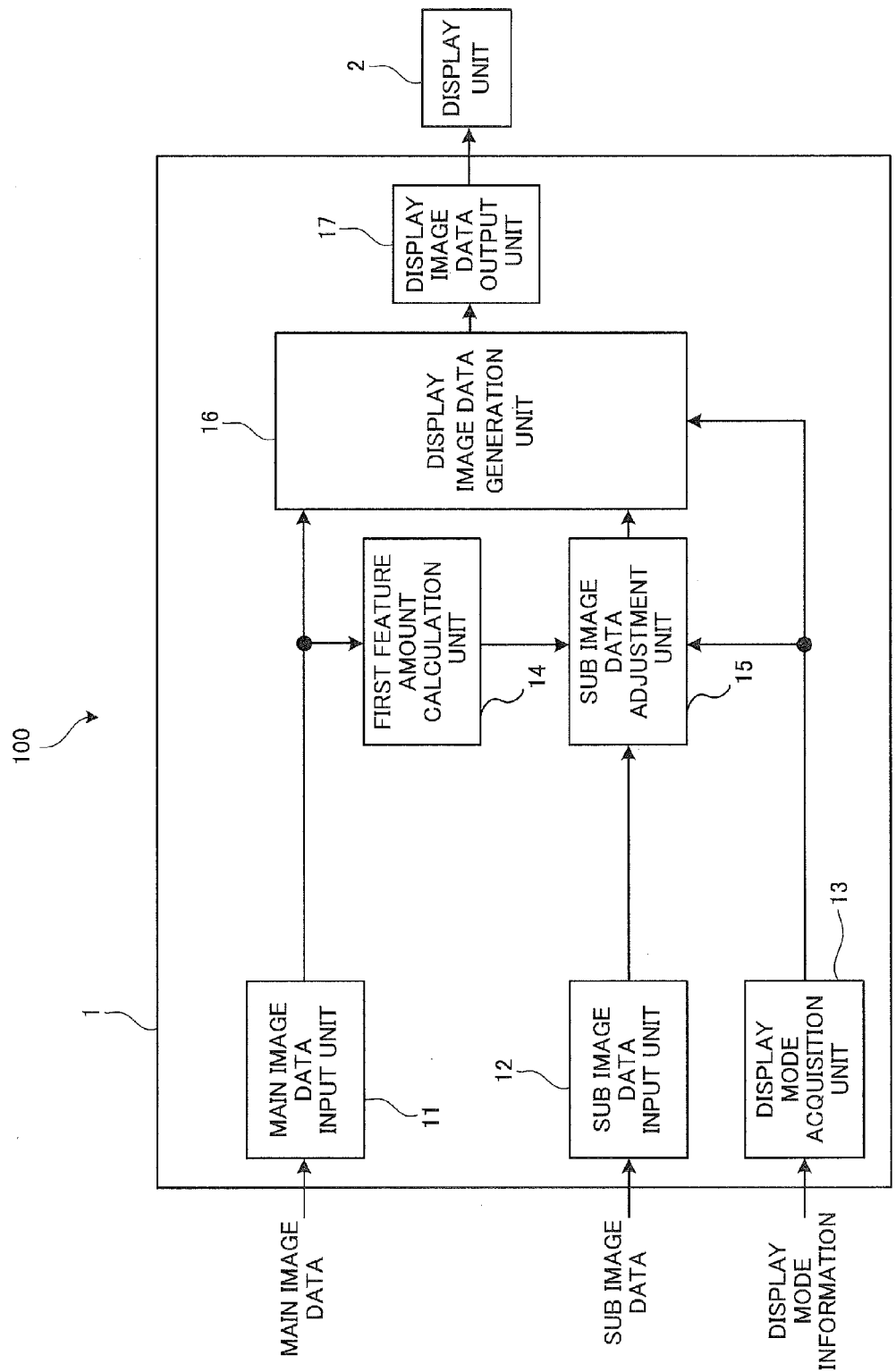

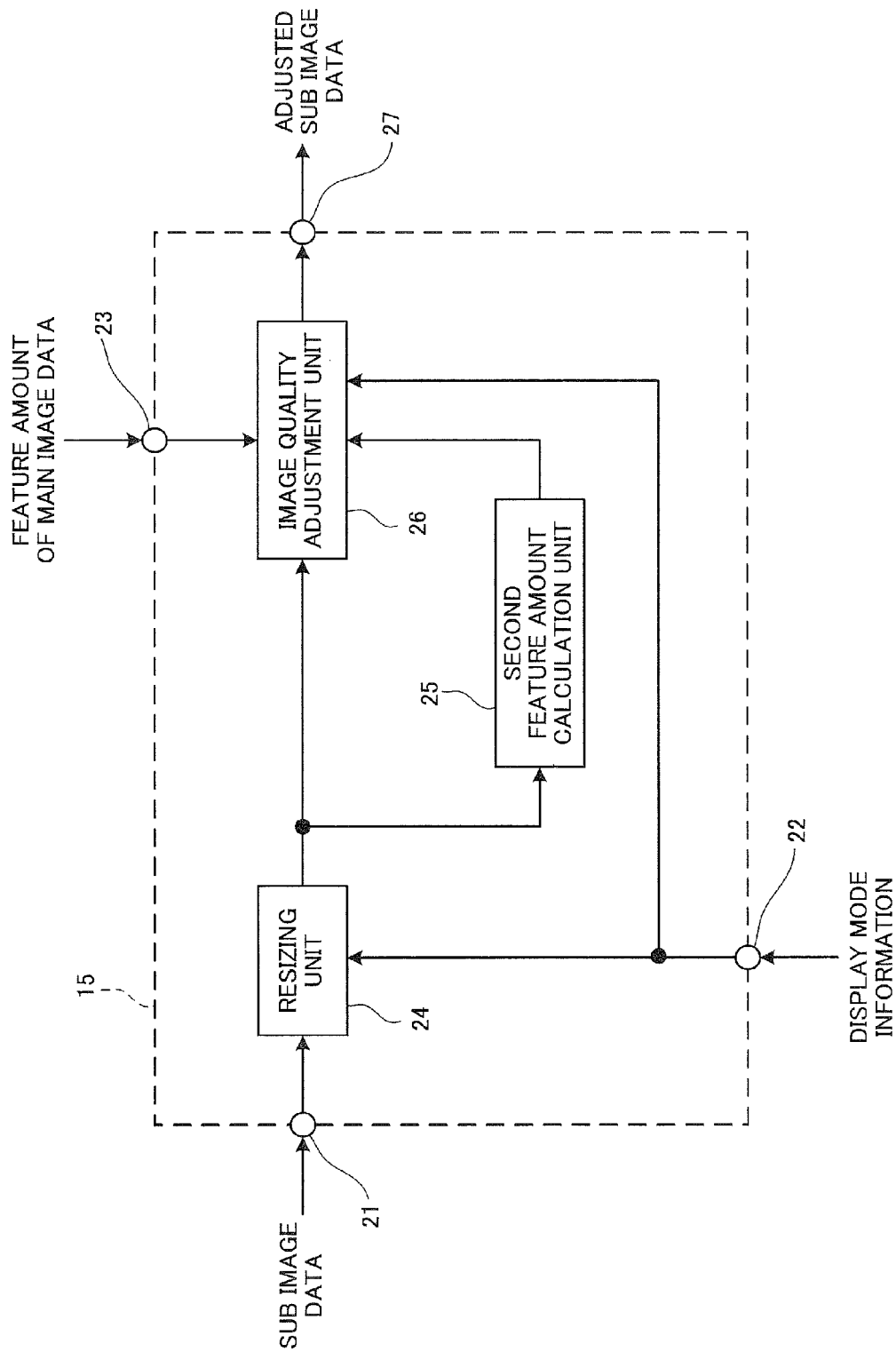

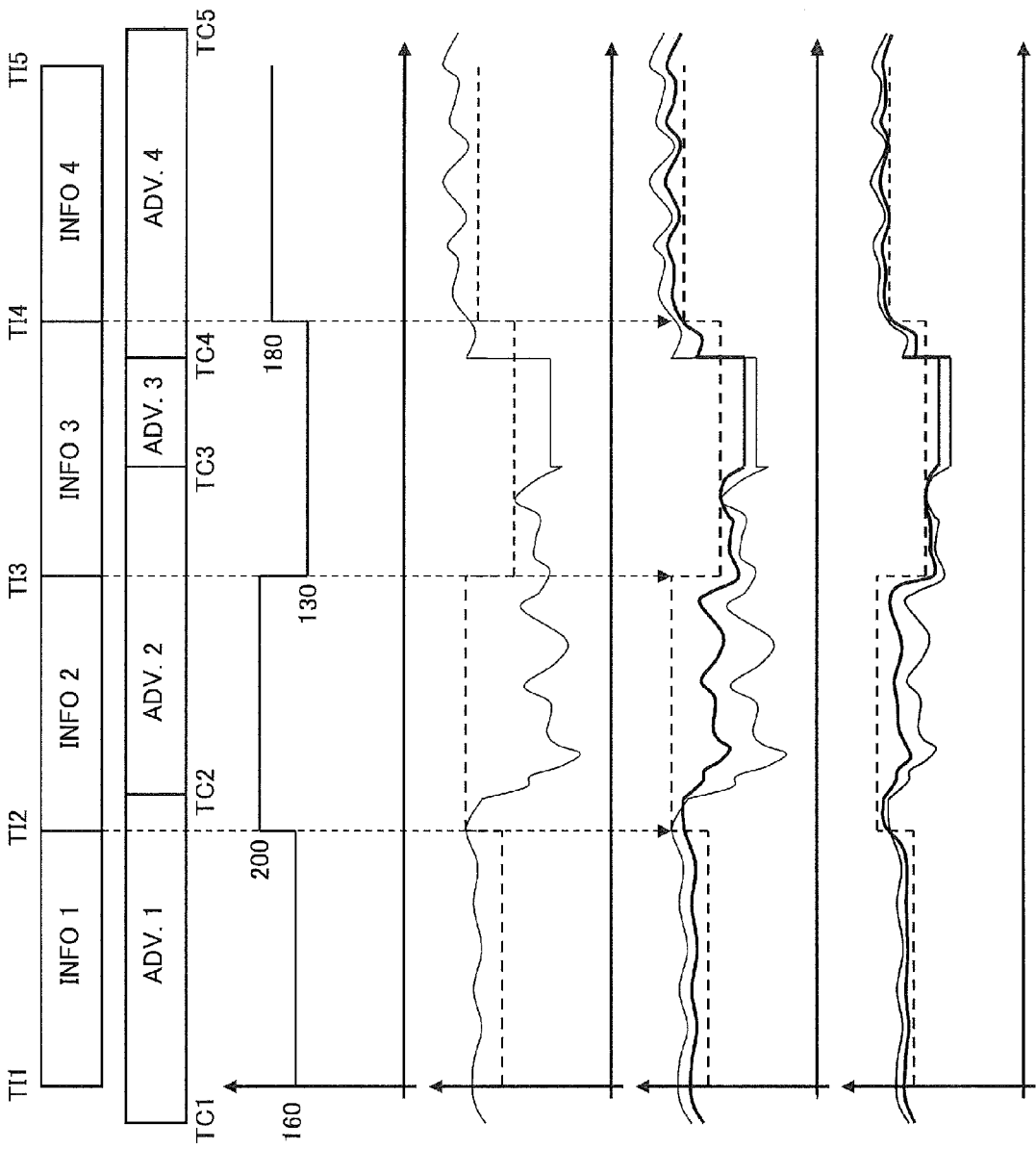

IMAGE PROCESSING DEVICE, DISPLAY DEVICE, IMAGE PROCESSING METHOD, DISPLAY METHOD, AND IMAGE PROCESSING PROGRAM

TECHNICAL FIELD

The present invention relates to an image processing device, a display device, an image processing method, a display method, and an image processing program.

BACKGROUND ART

In vehicles of public transportation, route information for the vehicles, information from government offices, and advertisement from private enterprises conventionally have been provided or displayed through paper medium in a fixed manner to the users. Recently, a part of the information is digitized; through electronic message boards using LEDs or liquid crystal displays, information on destinations, stops, transfers, or the like is variably displayed according to traveling sections, and advertisement is provided or displayed in the form of moving images or still images.

Patent Document 1 describes a display method of combining image data that are graphic data with relatively high luminance and image data of a natural image with relatively low luminance to generate and display image data. This method adjusts the maximum luminance of the image data with high luminance according to a feature amount of the image data with low luminance, combines the adjusted image data with high luminance and the image data with low luminance to generate display image data, then determines the brightness of a backlight according to a feature amount of the display image data, and adjusts the display image data according to the brightness of the backlight.

PRIOR ART DOCUMENTS

Patent Documents

Patent Document 1: Japanese Patent Application Publication No. 2006-154064

SUMMARY OF THE INVENTION

Problems to be Solved by the Invention

When a main image (e.g., a graphic image or a text image of information on the destination, stops, transfers, or the like of the vehicle) and a sub image (e.g., a natural image or an animation image such as an advertisement image) are displayed simultaneously or in a switching manner, it is desirable to display them in accordance with a display mode with an appropriate image quality.

An object of the present invention is to provide an image processing device, a display device, an image processing method, a display method, and an image processing program that make it possible, when a main image and a sub image are displayed simultaneously or in a switching manner, to display them in accordance with a display mode with an appropriate image quality.

Means for Solving the Problems

An image processing device according to the present invention is an image processing device for generating display image data for displaying a main image and a sub image simultaneously or in a switching manner, the image processing device including:

a main image data input means for receiving input of main image data representing the main image;

a sub image data input means for receiving input of sub image data representing the sub image;

a display mode acquisition means for acquiring display mode information indicating a display mode when the main image and the sub image are displayed;

a first feature amount calculation means for calculating a feature amount of the main image data input to the main image data input means;

a second feature amount calculation means for calculating a feature amount of the sub image data input to the sub image data input means or resized sub image data obtained by resizing the sub image data in accordance with the display mode information acquired by the display mode acquisition means;

an image quality adjustment means for performing image quality adjustment on the resized sub image data based on the feature amount of the main image data calculated by the first feature amount calculation means and the feature amount of the sub image data calculated by the second feature amount calculation means to generate adjusted sub image data; and a display image data generation means for generating the display image data from the main image data input to the main image data input means and the adjusted sub image data generated by the image quality adjustment means, in accordance with the display mode information acquired by the display mode acquisition means; wherein the image quality adjustment means performs the image quality adjustment so that a difference between a feature amount of the adjusted sub image data and the feature amount of the main image data is smaller than a difference between the calculated feature amount of the sub image data and the feature amount of the main image data; and the sub image data include image data of a plurality of content items arranged in time series, and when the image quality adjustment means performs the image quality adjustment for each of the content items, the image quality adjustment means updates the feature amount of the main image data used in the image quality adjustment, at the timing of change of the content item subjected to the image quality adjustment.

Another image processing device according to the present invention is an image processing device for generating display image data for displaying a main image and a sub image simultaneously or in a switching manner, the image processing device including:

a main image data input means for receiving input of main image data representing the main image;

a sub image data input means for receiving input of sub image data representing the sub image;

a display mode acquisition means for acquiring display mode information indicating a display mode when the main image and the sub image are displayed;

a second feature amount calculation means for calculating a feature amount of the sub image data input to the sub image data input means or resized sub image data obtained by resizing the sub image data in accordance with the display mode information acquired by the display mode acquisition means;

an image quality adjustment means for performing image quality adjustment on the resized sub image data to generate adjusted sub image data;

a display image data generation means for generating the display image data from the main image data input to the main image data input means and the adjusted sub image data generated by the image quality adjustment means, in accordance with the display mode information acquired by the display mode acquisition means; and a third feature amount calculation means for calculating a feature amount of the display image data generated by the display image data generation means; wherein in a case where the display mode indicated by the display mode information shifts from a simultaneous display mode in which the main image and the sub image are displayed simultaneously or a main image display mode in which only the main image is displayed to a sub image display mode in which only the sub image is displayed, when the image quality adjustment means performs the image quality adjustment on the sub image data corresponding to the sub image display mode after the shift, the image quality adjustment means performs, based on a reference feature amount obtained from a feature amount of the display image data corresponding to the display mode before the shift calculated by the third feature amount calculation means, the image quality adjustment so that a difference between a feature amount of the adjusted sub image data and the reference feature amount is smaller than a difference between the calculated feature amount of the sub image data and the reference feature amount; and the reference feature amount is a feature amount that gradually varies from the feature amount of the display image data to a preset value.

A display device according to the present invention includes: any of the above image processing devices; and a display means for displaying an image based on the display image data generated by the display image data generation means.

An image processing method according to the present invention is an image processing method for generating display image data for displaying a main image and a sub image simultaneously or in a switching manner, the image processing method including:

a main image data input step for receiving input of main image data representing the main image;

a sub image data input step for receiving input of sub image data representing the sub image;

a display mode acquisition step for acquiring display mode information indicating a display mode when the main image and the sub image are displayed;

a first feature amount calculation step for calculating a feature amount of the main image data input in the main image data input step;

a second feature amount calculation step for calculating a feature amount of the sub image data input in the sub image data input step or resized sub image data obtained by resizing the sub image data in accordance with the display mode information acquired by the display mode acquisition step;

an image quality adjustment step for performing image quality adjustment on the resized sub image data based on the feature amount of the main image data calculated in the first feature amount calculation step and the feature amount of the sub image data calculated in the second feature amount calculation step to generate adjusted sub image data; and a display image data generation step for generating the display image data from the main image data input in the main image data input step and the adjusted sub image data generated in the image quality adjustment step, in accordance with the display mode information acquired in the display mode acquisition step; wherein the image quality adjustment step performs the image quality adjustment so that a difference between a feature amount of the adjusted sub image data and the feature amount of the main image data is smaller than a difference between the calculated feature amount of the sub image data and the feature amount of the main image data; and the sub image data include image data of a plurality of content items arranged in time series, and when the image quality adjustment step performs the image quality adjustment for each of the content items, the image quality adjustment step updates the feature amount of the main image data used in the image quality adjustment, at the timing of change of the content item subjected to the image quality adjustment.

Another image processing method according to the present invention is an image processing method for generating display image data for displaying a main image and a sub image simultaneously or in a switching manner, the image processing method including:

a main image data input step for receiving input of main image data representing the main image;

a sub image data input step for receiving input of sub image data representing the sub image;

a display mode acquisition step for acquiring display mode information indicating a display mode when the main image and the sub image are displayed;

a second feature amount calculation step for calculating a feature amount of the sub image data input in the sub image data input step or sub image data obtained by resizing the sub image data in accordance with the display mode information acquired by the display mode acquisition step;

an image quality adjustment step for performing image quality adjustment on the resized sub image data to generate adjusted sub image data;

a display image data generation step for generating the display image data from the main image data input in the main image data input step and the adjusted sub image data generated in the image quality adjustment step, in accordance with the display mode information acquired in the display mode acquisition step; and a third feature amount calculation step for calculating a feature amount of the display image data generated in the display image data generation step; wherein in a case where, the display mode indicated by the display mode information shifts from a simultaneous display mode in which the main image and the sub image are displayed simultaneously or a main image display mode in which only the main image is displayed to a sub image display mode in which only the sub image is displayed, when the image quality adjustment step performs the image quality adjustment on the sub image data corresponding to the sub image display mode after the shift, the image quality adjustment step performs, based on a reference feature amount obtained from a feature amount of the display image data corresponding to the display mode before the shift calculated in the third feature amount calculation step, the image quality adjustment so that a difference between a feature amount of the adjusted sub image data and the reference feature amount is smaller than a difference between the calculated feature amount of the sub image data and the reference feature amount; and the reference feature amount is a feature amount that gradually varies from the feature amount of the display image data to a preset value.

A display method according to the present invention includes: any of the above image processing methods; and a display step for displaying an image based on the display image data generated in the display image data generation step.

An image processing program according to the present invention is an image processing program for generating display image data for displaying a main image and a sub image simultaneously or in a switching manner, the image processing program causing a computer to execute:

a main image data input step for receiving input of main image data representing the main image;

a sub image data input step for receiving input of sub image data representing the sub image;

a display mode acquisition step for acquiring display mode information indicating a display mode when the main image and the sub image are displayed;

a first feature amount calculation step for calculating a feature amount of the main image data input in the main image data input step;

a second feature amount calculation step for calculating a feature amount of the sub image data input in the sub image data input step or sub image data obtained by resizing the sub image data in accordance with the display mode information acquired in the display mode acquisition step;

an image quality adjustment step for performing image quality adjustment on the resized sub image data based on the feature amount of the main image data calculated in the first feature amount calculation step and the feature amount of the sub image data calculated in the second feature amount calculation step to generate adjusted sub image data; and a display image data generation step for generating the display image data from the main image data input in the main image data input step and the adjusted sub image data generated in the image quality adjustment step, in accordance with the display mode information acquired in the display mode acquisition step; wherein the image quality adjustment step performs the image quality adjustment so that a difference between a feature amount of the adjusted sub image data and the feature amount of the main image data is smaller than a difference between the calculated feature amount of the sub image data and the feature amount of the main image data; and the sub image data include image data of a plurality of content items arranged in time series, and when the image quality adjustment step performs the image quality adjustment for each of the content items, the image quality adjustment step updates the feature amount of the main image data used in the image quality adjustment, at the timing of change of the content item subjected to the image quality adjustment.

Another image processing program according to the present invention is an image processing program for generating display image data for displaying a main image and a sub image simultaneously or in a switching manner, the image processing program causing a computer to execute:

a main image data input step for receiving input of main image data representing the main image;

a sub image data input step for receiving input of sub image data representing the sub image;

a display mode acquisition step for acquiring display mode information indicating a display mode when the main image and the sub image are displayed;

a second feature amount calculation step for calculating a feature amount of the sub image data input in the sub image data input step or sub image data obtained by resizing the sub image data in accordance with the display mode information acquired in the display mode acquisition step;

an image quality adjustment step for performing image quality adjustment on the resized sub image data to generate adjusted sub image data;

a display image data generation step for generating the display image data from the main image data input in the main image data input step and the adjusted sub image data generated in the image quality adjustment step, in accordance with the display mode information acquired in the display mode acquisition step; and a third feature amount calculation step for calculating a feature amount of the display image data generated in the display image data generation step; wherein in a case where the display mode indicated by the display mode information shifts from a simultaneous display mode in which the main image and the sub image are displayed simultaneously or a main image display mode in which only the main image is displayed to a sub image display mode in which only the sub image is displayed, when the image quality adjustment step performs the image quality adjustment on the sub image data corresponding to the sub image display mode after the shift, the image quality adjustment step performs, based on a reference feature amount obtained from a feature amount of the display image data corresponding to the display mode before the shift calculated in the third feature amount calculation step, the image quality adjustment so that a difference between a feature amount of the adjusted sub image data and the reference feature amount is smaller than a difference between the calculated feature amount of the sub image data and the reference feature amount; and the reference feature amount is a feature amount that gradually varies from the feature amount of the display image data to a preset value.

Effect of the Invention

According to the present invention, it becomes possible, when a main image and a sub image are displayed simultaneously or in a switching manner, to display them in accordance with a display mode with an appropriate image quality.

BRIEF DESCRIPTION OF THE DRAWINGS

FIG. 1 is a block diagram showing the configuration of a display device according to a first embodiment.

FIG. 4 is a block diagram showing the configuration of a sub image data adjustment unit in the first embodiment.

FIGS. 8(a) to 8(f) are drawings for explaining an example of image quality adjustment in the first embodiment.

MODES FOR CARRYING OUT THE INVENTION

Figure 2A:
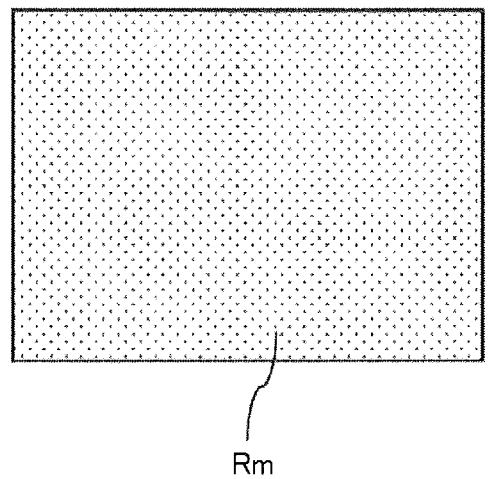
FIGS. 2(a) to 2(c) are drawings showing examples of display modes.

Embodiments of the invention will now be described with reference to the drawings.

First Embodiment

FIG. 1 is a block diagram showing the configuration of a display device 100 according to the first embodiment. The display device 100 is a device for displaying a main image and a sub image simultaneously or in a switching manner. Specifically, the main image is an image corresponding to a main purpose of the display device 100 or a primary image of an image displayed on the display device 100; the sub image is an image other than the main image or an image accompanying the main image. More specifically, the main image is an information image for guiding users of public transportation and is, for example, an image showing guidance information on the destination, stops, transfers, or the like of a passenger transportation means, such as a vehicle (train), a bus, a watercraft, an aircraft, or the like; the sub image is an image other than the above information image and is, for example, an advertisement image. The main image is a graphic image or a text image, and is typically a still image; the sub image is a natural image or an animation image, and is a moving image, a semi-moving image, or a still image. The display device 100 is placed in, for example, public transportation, such as a vehicle, a station, a bus, a bus stop, a watercraft, a port, an aircraft, an airport, or the like, and displays an advertisement image or other information in addition to guidance information on the destination, stops, transfers, or the like of a vehicle, a bus, a watercraft, an aircraft, or the like.

In FIG. 1, the display device 100 includes an image processing unit 1 and a display unit 2. The image processing unit 1 generates, from main image data representing a main image and sub image data representing a sub image, display image data for displaying the main image and the sub image simultaneously or in a switching manner. The display unit 2 is, for example, a liquid crystal display, and displays a display image based on the display image data generated by the image processing unit 1.

The image processing unit 1 includes a main image data input unit 11, a sub image data input unit 12, a display mode acquisition unit 13, a first feature amount calculation unit 14, a sub image data adjustment unit 15, a display image data generation unit 16, and a display image data output unit 17.

The main image data input unit 11 is, for example, an input terminal, and receives input of the main image data. The main image data consist of image data of a plurality of content items arranged in time series. The plurality of content items include, for example, content items in Japanese and content items in English for route display, neighborhood display, stop information, and transfer information, or other content items, and are arranged in time series so as to be switched and displayed at regular intervals. Each content item consists of a plurality of frames arranged in time series. The main image data input to the main image data input unit 11 are input to the first feature amount calculation unit 14 and display image data generation unit 16.

The sub image data input unit 12 is, for example, an input terminal, and receives input of the sub image data. The sub image data consist of image data of a plurality of content items arranged in time series. The plurality of content items are, for example, advertisement images, and are arranged in time series so as to be displayed in order. Each content item consists of a plurality of frames arranged in time series. The sub image data are, for example, moving images obtained by decoding coded data according to ITU-T (International Telecommunication Union-Telecommunication sector) recommendation H.26X, ISO/IEC (International Organization for Standardization/International Electrotechnical Commission) standard MPEG (Moving Picture Experts Group), or the like. The sub image data are not limited to moving images; they may be still images obtained by decoding coded data according to JPEG (Joint Photographic Experts Group). The sub image data input to the sub image data input unit 12 are input to the sub image data adjustment unit 15.

The display mode acquisition unit 13 acquires display mode information indicating a display mode when the main image and the sub image are displayed. Here, the display mode acquisition unit 13 is an input terminal that receives input of the display mode information from an external source. However, the display mode acquisition unit 13 may determine or select a display mode based on information, such as the current time or a display schedule, to generate display mode information.

Figure 2B:
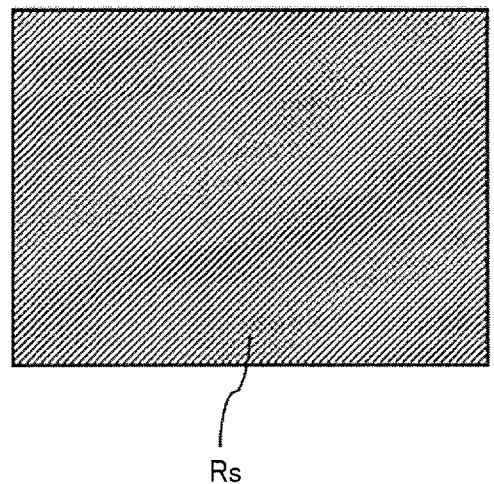
Figure 2C:
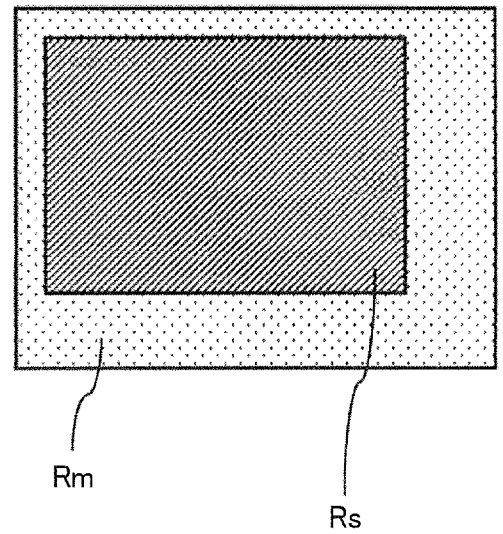

In this example, the display mode includes a main image display mode for displaying only the main image out of the main image and sub image, a sub image display mode for displaying only the sub image out of the main image and sub image, and a simultaneous display mode for displaying the main image and sub image simultaneously. FIGS. 2(a), 2(b), and 2(c) illustrate display images in the main image display mode, sub image display mode, and simultaneous display mode, respectively. As shown in FIG. 2(a), the display image in the main image display mode includes a main image region Rm in which the main image is displayed (e.g., an information region in which an information image is displayed). As shown in FIG. 2(b), the display image in the sub image display mode includes a sub image region Rs in which the sub image is displayed (e.g., an advertisement region in which an advertisement image is displayed). As shown in FIG. 2(c), the display image in the simultaneous display mode includes a main image region Rm and a sub image region Rs. The simultaneous display mode is, for example, a combination display mode for combining and displaying the main image and sub image; FIG. 2(c) illustrates a display image in the combination display mode.

Figure 3A:
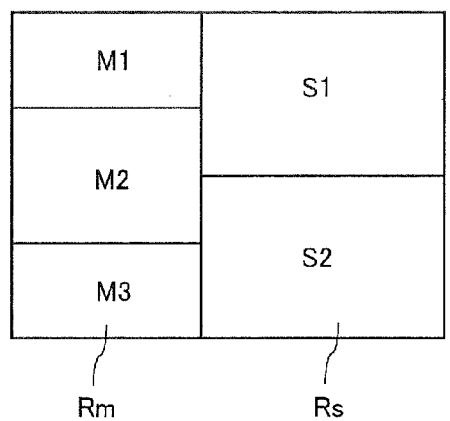
FIGS. 3(a) to 3(c) are drawings other examples of display modes.
Figure 3B:
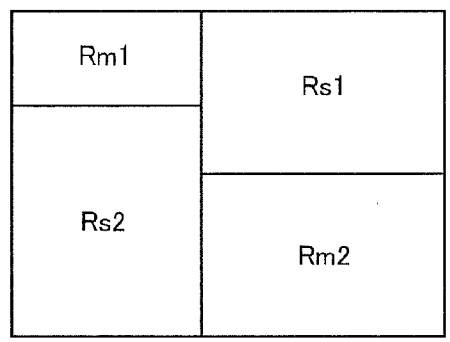
Figure 3C:
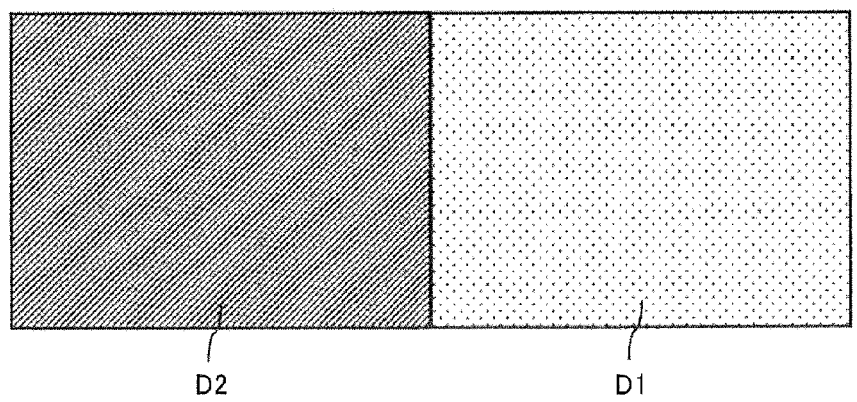

The display mode is not limited to the above. For example, plural images may be arranged in the main image region; the main image data may include image data of plural images displayed simultaneously. Similarly, plural images may be arranged in the sub image region; the sub image data may include image data of plural images displayed simultaneously. For example, as shown in FIG. 3(a), in the simultaneous display mode, three images M1, M2, and M3 may be displayed in the main image region Rm, and two images S1 and S2 may be displayed in the sub image region Rs. The main image region may be divided into plural regions; the main image may be divided and displayed in the plural regions. Similarly, the sub image region may be divided into plural regions; the sub image may be divided and displayed in the plural regions. For example, as shown in FIG. 3(b), in the simultaneous display mode, the main image region Rm may be divided into two regions Rm1 and Rm2, and the sub image region Rs may be divided into two regions Rs1 and Rs2. The simultaneous display mode is not limited to the combination display mode; it may be a two-screen display mode for displaying the main image and sub image on two display screen. In the two-screen display mode, for example, as shown in FIG. 3(c), two display screens D1 and D2 are arranged side by side; the main image is displayed on one display screen D1; the sub image is displayed on the other display screen D2. Here, the two display screens may be regarded as a single display screen; it may be considered to be equivalent to the combination display mode. The number of display screens is not limited to two; the display image may be displayed on three or more display screens. The display image may include a telop (or caption, subtitle, scrolling ticker). In this case, for example, a text telop may be regarded as a part of the main image. For example, a telop added to an information image may be regarded as a part of the main image; a telop added to an advertisement image may be regarded as a part of the sub image. The simultaneous display mode may include a plurality of types of display modes having different image layouts.

Referring to FIG. 1 again, the display mode information acquired by the display mode acquisition unit 13 is input to the sub image data adjustment unit 15 and display image data generation unit 16.

The first feature amount calculation unit 14 calculates a feature amount of the main image data input from the main image data input unit 11 and outputs the calculated feature amount of the main image data to the sub image data adjustment unit 15. Specifically, the feature amount is a feature amount regarding image quality of the main image data and is, for example, an average value (average luminance value), a greatest value (greatest luminance value), a smallest value (smallest luminance value), or a histogram (luminance histogram) of luminance values of the image data of each frame, an average value, a greatest value, a smallest value, or a histogram of gradation values of a predetermined color component or each of the color components of the image data of each frame, or the like. The color components are, for example, components of red (R), green (G), and blue (B), that is, RGB components. Specifically, the above average value etc. of luminance values etc. of the image data of each frame is an average value etc. of luminance values etc. of plural pixels constituting the one frame. The feature amount is not limited to a feature amount of each frame; it may be a feature amount obtained by averaging over plural frames (e.g., an average luminance value of each plural frames), or a feature amount obtained by averaging by the content item (e.g., an average luminance value of each content item). The feature amount is not limited to a luminance value or a gradation value; it may be a sharpness (clearness), a chroma (saturation), or the like. In this example, the main image data are image data of graphic images or text images of information images or the like; a feature amount does not vary greatly within one content item in the main image data.

The first feature amount calculation unit 14 may calculate the feature amount from the entire picture of the main image data or a part of the picture of the main image data displayed as the display image.

The sub image data adjustment unit 15 performs, on the sub image data input from the sub image data input unit 12, resizing processing in accordance with the display mode information input from the display mode acquisition unit 13, adjustment of image quality based on the feature amount of the main image data calculated by the first feature amount calculation unit 14, or other processing, to generate and output adjusted sub image data. The sub image data adjustment unit 15 will be detailed later.

The display image data generation unit 16 generates, from the main image data input from the main image data input unit 11 and the adjusted sub image data output from the sub image data adjustment unit 15, in accordance with the display mode information input from the display mode acquisition unit 13, display image data for displaying the main image and sub image simultaneously or in a switching manner. Specifically, when the display mode indicated by the display mode information is the main image display mode, the display image data generation unit 16 selects the main image data to output them as the display image data; when the display mode is the sub image display mode, it selects the adjusted sub image data to output them as the display image data. When the display mode is the combination display mode, the display image data generation unit 16 outputs, as the display image data, image data obtained by combining the main image data and sub image data. For example, the display image data generation unit 16 outputs, as the display image data, image data of an image obtained by overwriting a part of the image region of the main image with the sub image, an image obtained by selecting and combining the main image and sub image by the region, or an image obtained by combining (or bonding) one or more partial images of the main image and one or more partial images of the sub image.

The display image data generation unit 16 performs the generation of the display image data in accordance with the display mode for each frame of the main image data and sub image data, and outputs display image data consisting of a plurality of frames, for example.

The display image data output unit 17 is, for example, an output terminal, and outputs the display image data generated by the display image data generation unit 16 to the display unit 2.

The sub image data adjustment unit 15 will be described in detail below. FIG. 4 is a block diagram showing the configuration of the sub image data adjustment unit 15. In FIG. 4, the sub image data adjustment unit 15 includes input terminals 21, 22, and 23, a resizing unit 24, a second feature amount calculation unit 25, an image quality adjustment unit 26, and an output terminal 27.

The input terminal 21 receives input of the sub image data from the sub image data input unit 12; the input sub image data are input to the resizing unit 24. The input terminal 22 receives input of the display mode information from the display mode acquisition unit 13; the input display mode information is input to the resizing unit 24 and image quality adjustment unit 26. The input terminal 23 receives input of the feature amount of the main image data from the first feature amount calculation unit 14; the input feature amount of the main image data is input to the image quality adjustment unit 26.

The resizing unit 24 resizes the sub image data input from the input terminal 21 in accordance with the display mode indicated by the display mode information input from the input terminal 22 and outputs resized sub image data. Specifically, the resizing unit 24 alters, for each frame of the sub image data, the image size of the image data of the frame to an image size according to the display mode corresponding to the frame and outputs image data of the frame after the resizing. The resizing unit 24 may perform the resizing processing as necessary depending on the display mode. The resized sub image data generated by the resizing unit 24 are input to the second feature amount calculation unit 25 and image quality adjustment unit 26.

The second feature amount calculation unit 25 calculates a feature amount of the resized sub image data output from the resizing unit 24 and outputs the calculated feature amount of the sub image data to the image quality adjustment unit 26. Specifically, the feature amount is a feature amount regarding image quality of the sub image data and is, for example, an average value (average luminance value), a greatest value (greatest luminance value), a smallest value (smallest luminance value), or a histogram (luminance histogram) of luminance values of the image data of each frame, an average value, a greatest value, a smallest value, or a histogram of gradation values of a predetermined color component or each of the color components of the image data of each frame, or the like. The color components are, for example, RGB components. Specifically, the above average value etc. of luminance values etc. of the image data of each frame is an average value etc. of luminance values etc. of plural pixels constituting the one frame. The feature amount is not limited to a feature amount of each frame; it may be a feature amount obtained by averaging over plural frames (e.g., an average luminance value of each plural frames), or a feature amount obtained by averaging by the content item (e.g., an average luminance value of each content item). The feature amount is not limited to a luminance value or a gradation value; it may be a sharpness, a chroma, or the like.

The second feature amount calculation unit 25 may calculate the feature amount from the entire picture of the sub image data or a part of the picture of the sub image data displayed as the display image.

The second feature amount calculation unit 25 may receive, from the input terminal 21, input of the sub image data input to the sub image data input unit 12 and calculate a feature amount of the sub image data. In this case, in FIG. 4, the input terminal 21 may connect to the second feature amount calculation unit 25, and the connection between the resizing unit 24 and the second feature amount calculation unit 25 may be omitted.

In the following description, regarding a feature amount of the main image data and a feature amount of the sub image data, a feature amount corresponding to a frame when the feature amount is calculated for each frame will be referred to as a 'feature amount of the frame'; a feature amount corresponding to a content item when the feature amount is calculated for each content item will be referred to as a 'feature amount of the content item'.

The image quality adjustment unit 26 performs image quality adjustment on the resized sub image data output from the resizing unit 24 based on the feature amount of the main image data input from the input terminal 23 and the feature amount of the sub image data calculated by the second feature amount calculation unit 25 to generate and output adjusted sub image data. Specifically, the image quality adjustment unit 26 determines, from the feature amount of the main image data and the feature amount of the sub image data, a setting value (e.g., an adjustment level or an adjustment amount) for image quality adjustment, and performs image quality adjustment on the resized sub image data in accordance with the setting value. For example, when determining an adjustment level, the image quality adjustment unit 26 performs image quality adjustment so that a feature amount of the sub image data matches the adjustment level; when determining an adjustment amount, it performs image quality adjustment so that a feature amount of the sub image data changes by the adjustment amount by the image quality adjustment.

The image quality adjustment unit 26 performs the image quality adjustment so that a difference between a feature amount of the adjusted sub image data and the feature amount of the main image data is smaller than a difference between the feature amount of the sub image data calculated by the second feature amount calculation unit 25 (i.e., the feature amount of the sub image data before the adjustment) and the feature amount of the main image data. That is, the image quality adjustment unit 26 performs the image quality adjustment so that the feature amount of the sub image data approaches the feature amount of the main image data by the image quality adjustment.

The image quality adjustment unit 26 performs the image quality adjustment for each frame of the sub image data, for example. When the image quality adjustment unit 26 performs the image quality adjustment on a frame Fs of the sub image data, it performs the image quality adjustment based on the feature amount of the main image data corresponding to the frame Fs and the feature amount of the sub image data corresponding to the frame Fs. The feature amount of the main image data corresponding to the frame Fs includes, for example, a feature amount of a frame Fm (frame of the main image data displayed simultaneously with the frame Fs) of the main image data corresponding to the frame Fs, and a feature amount of the content item to which the frame Fm belongs. The feature amount of the sub image data corresponding to the frame Fs includes, for example, a feature amount of the frame Fs, and a feature amount of the content item to which the frame Fs belongs.

The image quality adjustment unit 26 may perform the image quality adjustment as necessary depending on the display mode based on the display mode information input from the input terminal 22.

The adjusted sub image data generated by the image quality adjustment unit 26 are output through the output terminal 27 to the display image data generation unit 16.

In one aspect, the above image processing unit 1 performs the resizing and image quality adjustment on the sub image data frame by frame in the order in which the frames are displayed (or arranged) to generate display image data. However, the image processing unit 1 need not necessarily process the frames frame by frame in the display order of the frames; it may process the frames in an order different from the display order of the frames or in parallel.

Figure 5A:
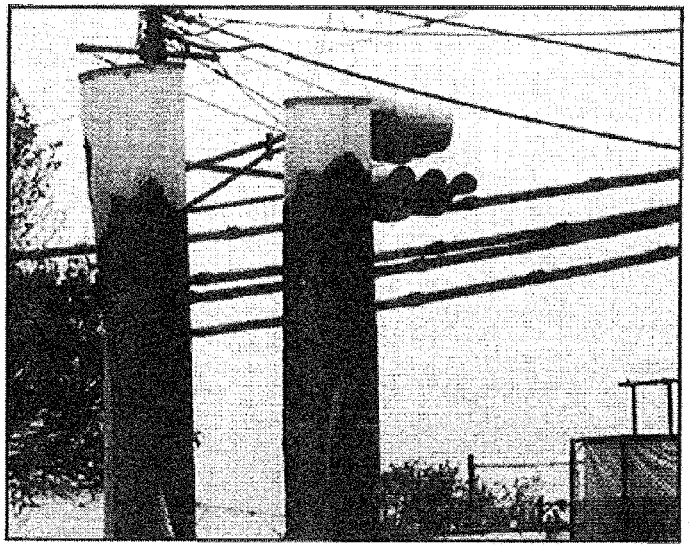
FIGS. 5(a) and 5(b) are drawings showing an example of the image of sub image data input to an image quality adjustment unit and an example of the luminance histogram of the sub image data, respectively.
Figure 5B:
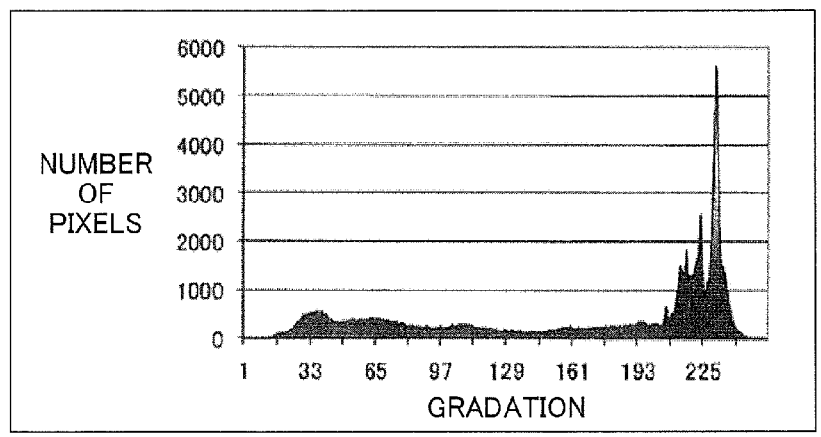

An example of the method of the image quality adjustment by the image quality adjustment unit 26 will be described below with reference to FIGS. 5 to 7. FIG. 5(*a*)

shows an image (sub image) of sub image data output from the resizing unit 24; FIG. 5(b) shows a luminance histogram of the sub image data.

Figure 6A:
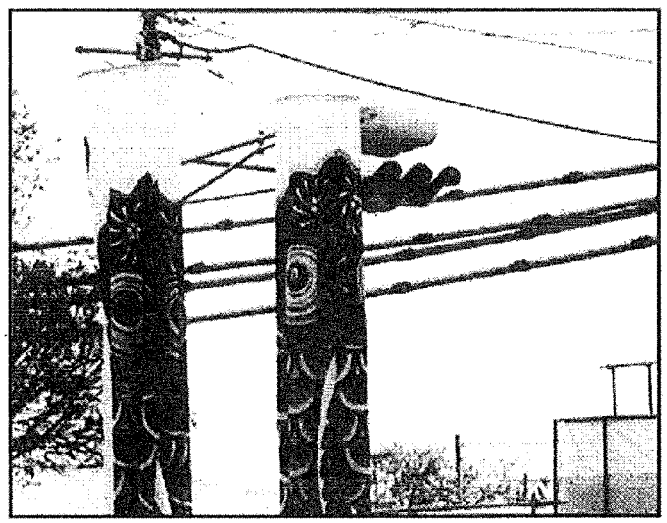
FIGS. 6(a) and 6(b) are drawings showing an example of the image of the sub image data adjusted to be brighter by the image quality adjustment unit and an example of the luminance histogram of the adjusted sub image data, respectively.
Figure 6B:
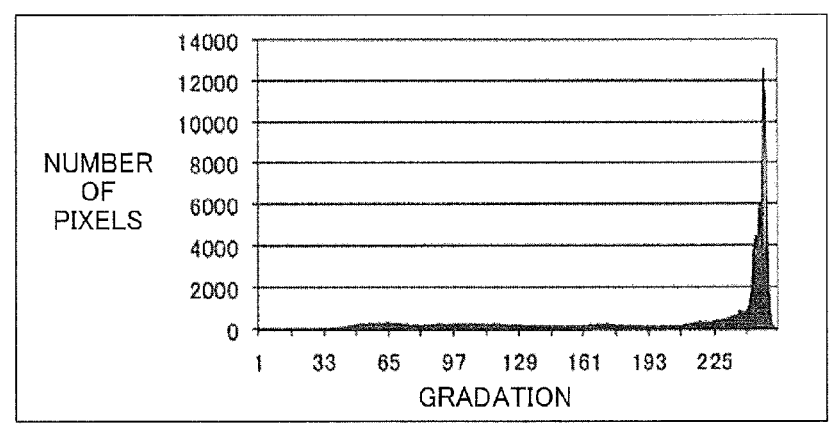
Figure 6C:
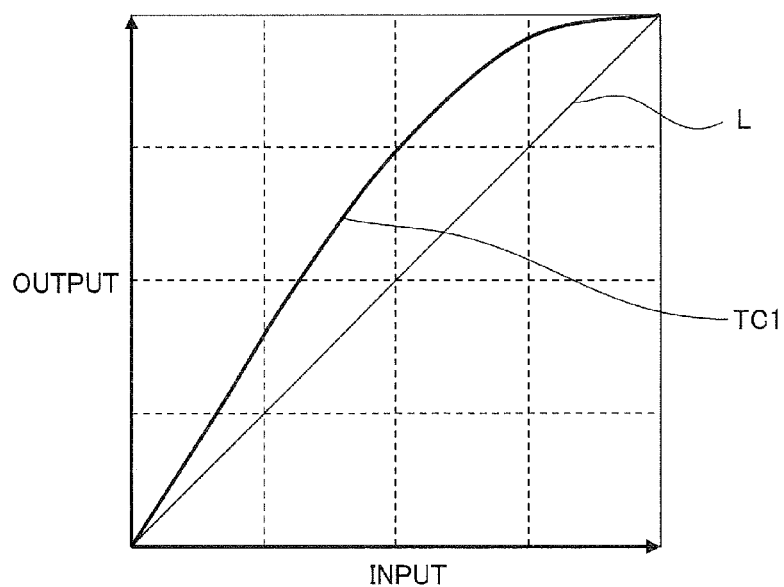
FIG. 6(c) is a drawing showing a tone curve used for the adjustment.

When an average luminance value of the sub image data output from the second feature amount calculation unit 25 is smaller than an average luminance value of the main image data input from the input terminal 23, the image quality adjustment unit 26 performs the image quality adjustment so as to increase the average luminance value of the sub image data. Specifically, the image quality adjustment unit 26 raises intermediate gradations of the sub image data by using an upward convex tone curve TC1 as indicated by the thick line in FIG. 6(c). In FIG. 6(c), the horizontal axis represents a luminance value of the sub image data before the adjustment (input); the vertical axis represents a luminance value of the sub image data after the adjustment (output); the thin line represents a linear characteristic L in which the output is equal to the input. The image quality adjustment unit 26 adjusts the luminance value of each pixel constituting the sub image data according to the tone curve TC1. With the adjustment according to the tone curve TC1, the sub image of FIG. 5(a) is adjusted as shown in FIG. 6(a); the luminance histogram of FIG. 5(b) is adjusted as shown in FIG. 6(b); the sub image data is adjusted in a direction in which the sub image data become brighter (i.e., the feature amount of the sub image data approaches the feature amount of the main image data).

Figure 7A:
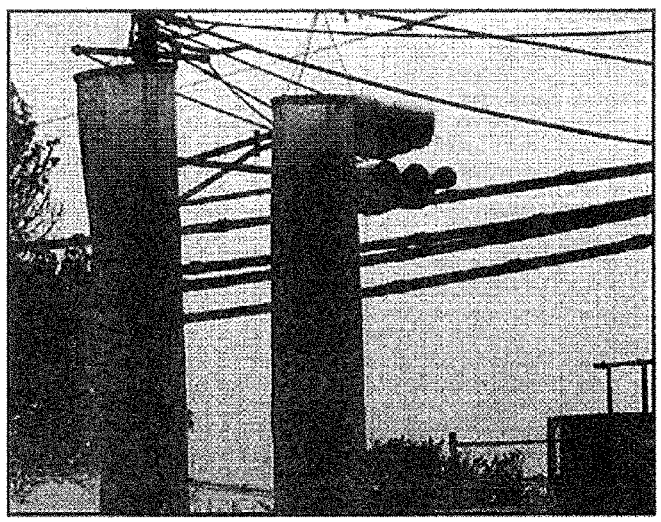
FIGS. 7(a) and 7(b) are drawings showing an example of the image of the sub image data adjusted to be darker by the image quality adjustment unit and an example of the luminance histogram of the adjusted sub image data, respectively.
Figure 7B:
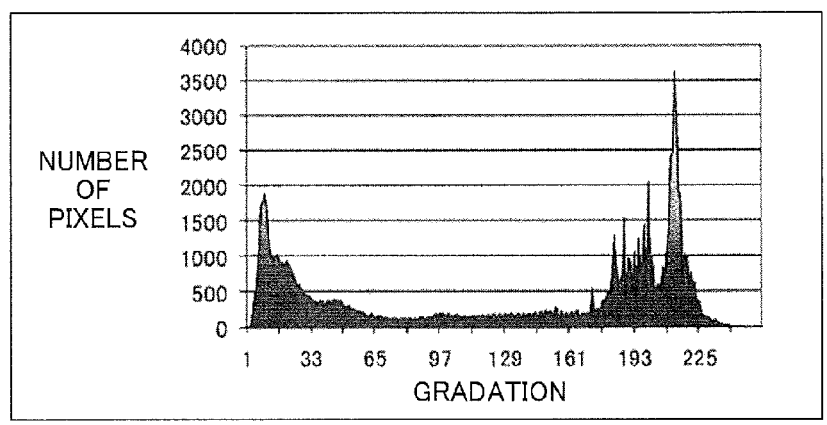
Figure 7C:
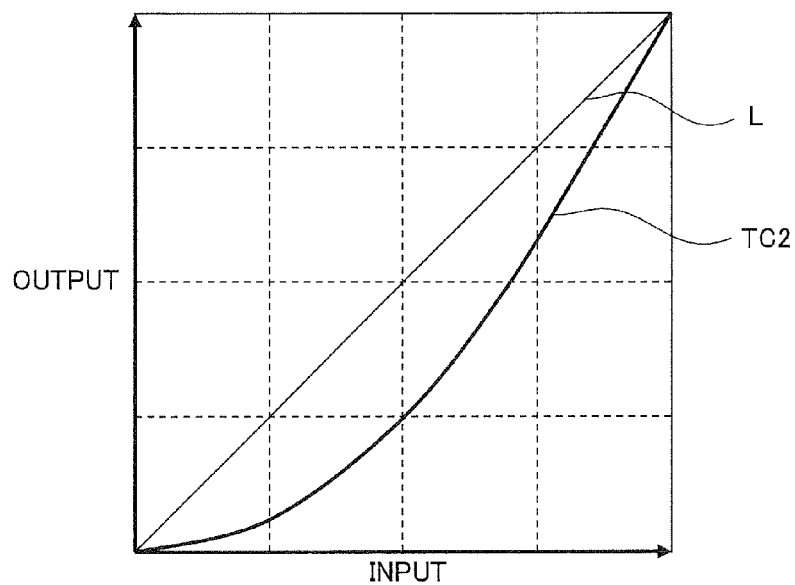
FIG. 7(c) is a drawing showing a tone curve used for the adjustment.

In contrast, when an average luminance value of the sub image data is greater than an average luminance value of the main image data, the image quality adjustment unit 26 performs the image quality adjustment so as to decrease the average luminance value of the sub image data. Specifically, the image quality adjustment unit 26 lowers intermediate gradations of the sub image data by using a downward convex tone curve TC2 as indicated by the thick line in FIG. 7(c). In FIG. 7(c), the horizontal axis represents a luminance value of the sub image data before the adjustment (input); the vertical axis represents a luminance value of the sub image data after the adjustment (output); the thin line represents a linear characteristic L in which the output is equal to the input. The image quality adjustment unit 26 adjusts the luminance value of each pixel constituting the sub image data according to the tone curve TC2. With the adjustment according to the tone curve TC2, the sub image of FIG. 5(a) is adjusted as shown in FIG. 7(a); the luminance histogram of FIG. 5(b) is adjusted as shown in FIG. 7(b); the sub image data is adjusted in a direction in which the sub image data become darker (i.e., the feature amount of the sub image data approaches the feature amount of the main image data).

The above example illustrates a case where the image quality adjustment is performed using average luminance values. However, the feature amounts for performing the image quality adjustment (e.g., luminance adjustment) of the sub image data are not limited to average luminance values; they may be, for example, greatest luminance values, smallest luminance values, or luminance histograms, or average values, greatest values, smallest values, or histograms of gradation values of each color component. The image quality adjustment unit 26 may determine gradations desired to be brighter or darker based on greatest luminance values, smallest luminance values, or luminance histograms, or average values, greatest values, smallest values, or histograms of gradation values of each color component, or the like, and adjust the characteristics of the tone curve. The image quality adjustment unit 26 may be configured to adjust the concavity and convexity of the tone curve based on a difference between the feature amount of the main image data and the feature amount of the sub image data.

The method of the image quality adjustment is not limited to one using a tone curve; for example, it is also possible to perform the adjustment by moving up or down one or both of a greatest value and a smallest value of the sub image data viewing a histogram to increase or decrease the gradation range of the sub image data. For example, the image quality adjustment 26 may adjust the luminance values of the respective pixels of the sub image data so that the greatest luminance value and smallest luminance value of the sub image data respectively approach the greatest luminance value and smallest luminance value of the main image data in such a manner that the shape of the luminance histogram of the sub image data after the image quality adjustment is similar to that before the image quality adjustment.

The image quality adjustment unit 26 may perform processing for increasing the sharpness of the sub image data when the sharpness of the sub image data is lower than that of the main image data; it may perform processing for decreasing the sharpness of the sub image data in the opposite case. The image quality adjustment unit 26 may perform processing for increasing the chroma of the sub image data when the chroma of the sub image data is lower than that of the main image data; it may perform processing for decreasing the chroma of the sub image data in the opposite case.

Next, an example of the image quality adjustment when the display mode is the simultaneous display mode will be described with reference to FIG. 8. This example uses an average luminance value of each frame as a feature amount.

FIG. 8(a) shows main image data consisting of content items of information items 1, 2, 3, and 4. The information items 1, 2, 3, and 4 are arranged in this order in time series; the positions (or display time periods) of the information items 1, 2, 3, and 4 in the time sequence are from a time point TI1 to a time point TI2, from the time point TI2 to a time point TI3, from the time point TI3 to a time point TI4, and from the time point TI4 to a time point TI5, respectively.

FIG. 8(b) shows sub image data consisting of content items of advertisements 1, 2, 3, and 4. The advertisements 1, 2, and 4 are moving images; the advertisement 3 is a still image. The advertisements 1, 2, 3, and 4 are arranged in this order in time series; the positions (or display time periods) of the advertisements 1, 2, 3, and 4 in the time sequence are from a time point TC1 to a time point TC2, from the time point TC2 to a time point TC3, from the time point TC3 to a time point TC4, and from the time point TC4 to a time point TC5, respectively. A relation of TC1<TI1<TI2<TC2<TI3<TC3<TC4<TI4<TI5<TC5 is satisfied.

In the information item k (k=1, 2, 3, 4), although text data may be updated and a part may be moved by animation display, the feature amount does not vary greatly. In the advertisement m (m=1, 2, 4) of a moving image, there are movements and the feature amount varies greatly. In the advertisement n (n=3) of a still image, there is no movement and thus the feature amount does not vary.

FIG. 8(c) shows an average luminance value of the main image data (feature amount of the main image data output from the first feature amount calculation unit 14). FIG. 8(d) shows an average luminance value of the sub image data (feature amount of the sub image data output from the second feature amount calculation unit 25).

The image quality adjustment unit 26 performs the image quality adjustment on the resized sub image data from the feature amount of the main image data and feature amount of the sub image data. In FIG. 8(e), the thin solid line represents the average luminance value of the sub image data before the image quality adjustment; the dashed line represents the average luminance value of the main image data; the thick solid line represents the average luminance value of the sub image data after the image quality adjustment. As shown in FIG. 8(e), the image quality adjustment unit 26 performs the image quality adjustment on the sub image data so that the average luminance value of the sub image data approaches the average luminance value of the main image data. Specifically, the image quality adjustment unit 26 performs the image quality adjustment on each frame of the sub image data; when performing the image quality adjustment on a frame Fs of the sub image data, it performs the image quality adjustment so that the average luminance value Ls' of the frame Fs after the image quality adjustment is equal to an average value of the average luminance value Ls of the frame Fs before the image quality adjustment and the average luminance value Lm of a frame Fm of the main image data corresponding to the frame Fs, that is, an equation of $Ls'=(Ls+Lm)/2$ is satisfied. When the main image and the sub image have the same number of pixels as in FIG. 3(c), the average luminance value of the sub image data after the image quality adjustment is equal to an average luminance value of the whole (entire area of the picture) of the main image and sub image before the image quality adjustment. It is not mandatory that the average luminance value of the sub image data after the image quality adjustment is equal to the average value of the average luminance value of the sub image data before the image quality adjustment and the average luminance value of the main image data; it is enough that image quality adjustment is made in such a direction.

In FIG. 8(f), the thin solid line represents the average luminance value of the sub image data after the image quality adjustment; the dashed line represents the average luminance value of the main image data; the thick solid line represents the average luminance value of display image data in which the sub image data after the image quality adjustment and the main image data are combined.

The above description illustrates a case where the image quality adjustment of the sub image data is performed when the main image and sub image are displayed simultaneously. However, the image quality adjustment of the sub image data may be performed when the main image and sub image are switched and displayed. For example, when the display mode shifts from the main image display mode to the sub image display mode, the image quality adjustment unit 26 may perform the image quality adjustment on the sub image data displayed in the sub image display mode based on the feature amount of the main image data displayed in the main image display mode and the feature amount of the sub image data displayed in the sub image display mode.

Figure 9:
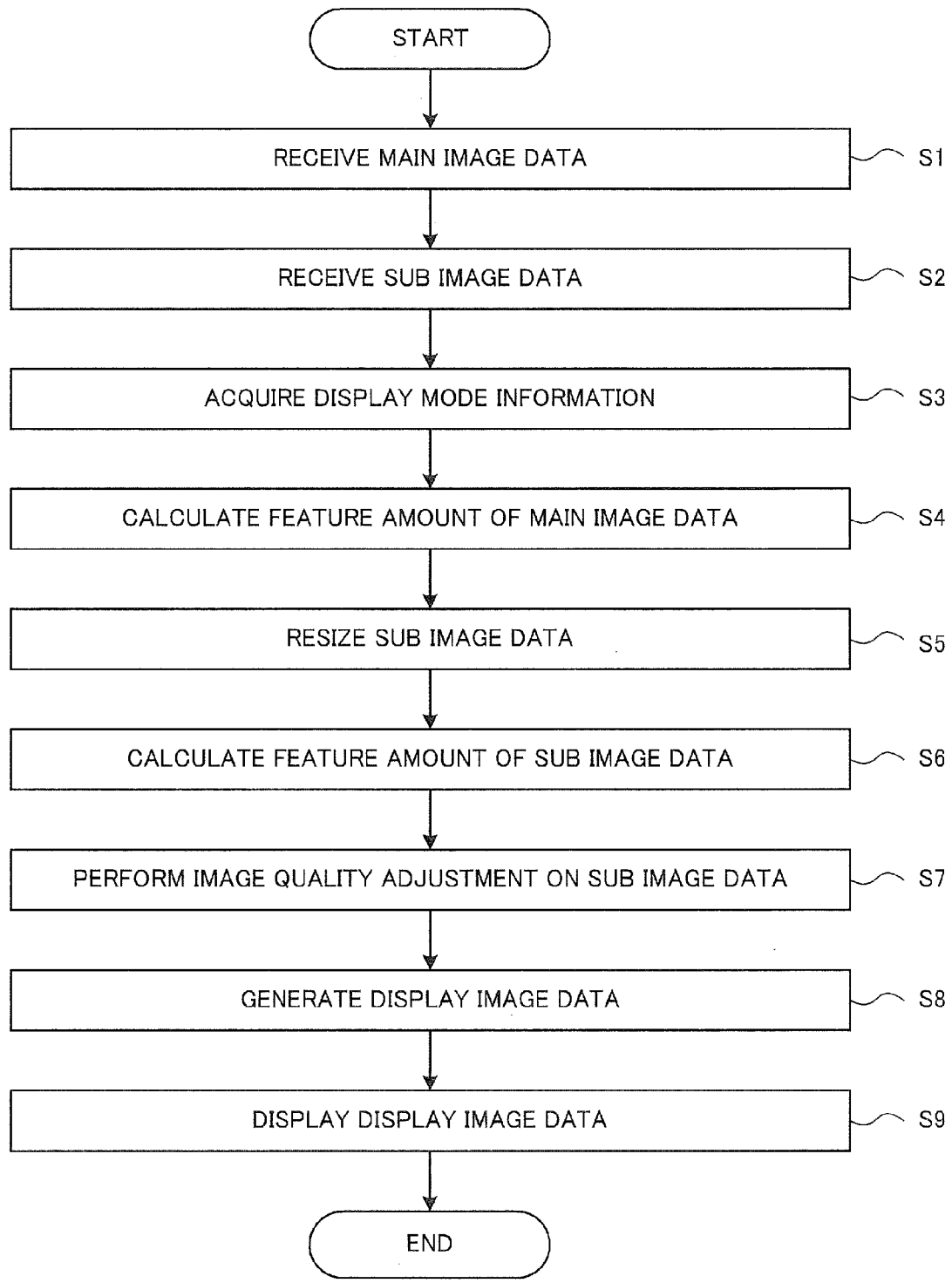
FIG. 9 is a flowchart showing the operation of the display device according to the first embodiment.

FIG. 9 is a flowchart showing the operation of the display device 100 according to the first embodiment (or a display method according to the first embodiment). The operation of the display device 100 will be described below with reference to FIG. 9.

The image processing unit 1 receives input of main image data (S1) and receives input of sub image data (S2). The image processing unit 1 also acquires display mode information (S3).

The image processing unit 1 calculates a feature amount of the main image data input in step S1 (S4). The image processing unit 1 resizes the sub image data input in step S2 in accordance with the display mode information acquired in step S3 (S5), and calculates a feature amount of the input sub image data or the resized sub image data (S6). Then, the image processing unit 1 performs image quality adjustment on the resized sub image data based on the feature amount of the main image data calculated in step S4 and the feature amount of the sub image data calculated in step S6 to generate adjusted sub image data (S7). Then, the image processing unit 1 combines or selects the main image data input in step S1 and the adjusted sub image data generated in step S7 in accordance with the display mode information acquired in step S3 to generate display image data (S8). The display unit 2 displays the display image data generated in step S8 on a display screen (S9).

As above, in this embodiment, the image processing unit includes: the first feature amount calculation unit that calculates a feature amount of the main image data; the second feature amount calculation unit that calculates a feature amount of the sub image data; the image quality adjustment unit that performs, based on the feature amount of the main image data and the feature amount of the sub image data, image quality adjustment on resized sub image data obtained by resizing the sub image data in accordance with the display mode information to generate adjusted sub image data; and the display image data generation unit that generates display image data from the main image data and adjusted sub image data in accordance with the display mode information. The image quality adjustment unit performs the image quality adjustment so that a difference between a feature amount of the adjusted sub image data and the feature amount of the main image data is smaller than a difference between the calculated feature amount of the sub image data (i.e., the feature amount of the sub image data before the adjustment) and the feature amount of the main image data. With this configuration, it becomes possible, when a main image and a sub image are displayed simultaneously or in a switching manner, to display them in accordance with a display mode with an appropriate image quality.

Specifically, when a main image and a sub image are displayed simultaneously or in a switching manner, by performing the image quality adjustment so that the difference in the feature amount between the main image and the sub image is reduced, the visibility of the images can be improved. For example, when a main image and a sub image are displayed simultaneously, such as when a main image and a sub image are combined and displayed as in FIG. 2(c), or a main image and a sub image are displayed side by side as in FIG. 3(c), if the luminance of the sub image is lower or higher than the luminance of the main image, by reducing the difference in luminance between the images, the visibility when the two are viewed simultaneously can be improved. Also, when a main image and a sub image are displayed in a switching manner, by reducing the difference in luminance between the main image and the sub image, the visibility when the two are viewed temporally continuously can be improved.

Further, since the image quality adjustment is performed on the sub image data, it is possible to display the sub image data with an appropriate image quality relative to the main image data and improve the visibility of the display image, without changing the main image data. Specifically, since the image quality adjustment does not change the main image data, it is possible to improve the image quality of the sub image (e.g., an advertisement image) while maintaining the image quality of the main image (e.g., an information image), which is designed to conform to the display mode, display environment, or the like. For example, in the display device described in Patent Document 1, when a graphic image or a text image designed to be displayed on the display device and a natural image are combined and displayed, the graphic image or text image is adjusted based on a feature amount of the natural image, and thus the image quality or appearance of the graphic image or text image changes. In contrast, according to this embodiment, when a graphic image or a text image, such as an information image, that is a main image of the display device and a natural image or an animation image, such as an advertisement image, that is a sub image are displayed simultaneously or in a switching manner, it is possible to display the natural image or animation image with an optimum luminance ratio or contrast ratio relative to the graphic image or text image while maintaining the image quality of the graphic image or text image.

Further, the sub image data are resized in accordance with the display mode information, and the display image data are generated from the main image data and resized sub image data in accordance with the display mode information. Thus, the main image and sub image can be displayed in a displaying manner according to the display mode information.

Further, a region in which the display image is displayed is divided into a sub image region (e.g., an advertisement region) that displays the sub image and a main image region (e.g., an information region) that displays the main image, and only the sub image region (region that need to be adjusted) is subjected to image quality adjustment. This prevents a situation where a boundary part between the sub image region and the main image region is adjusted and the boundary is blurred.

Second Embodiment

The display device according to the second embodiment is identical to the display device 100 according to the first embodiment except for a portion regarding control of the feature amount of the main image data used for the image quality adjustment as described below. Descriptions of parts that are the same as in the first embodiment will be omitted or simplified in the description below, and the same reference characters will be used for elements that are the same as or correspond to those in the first embodiment.

Figure 10:
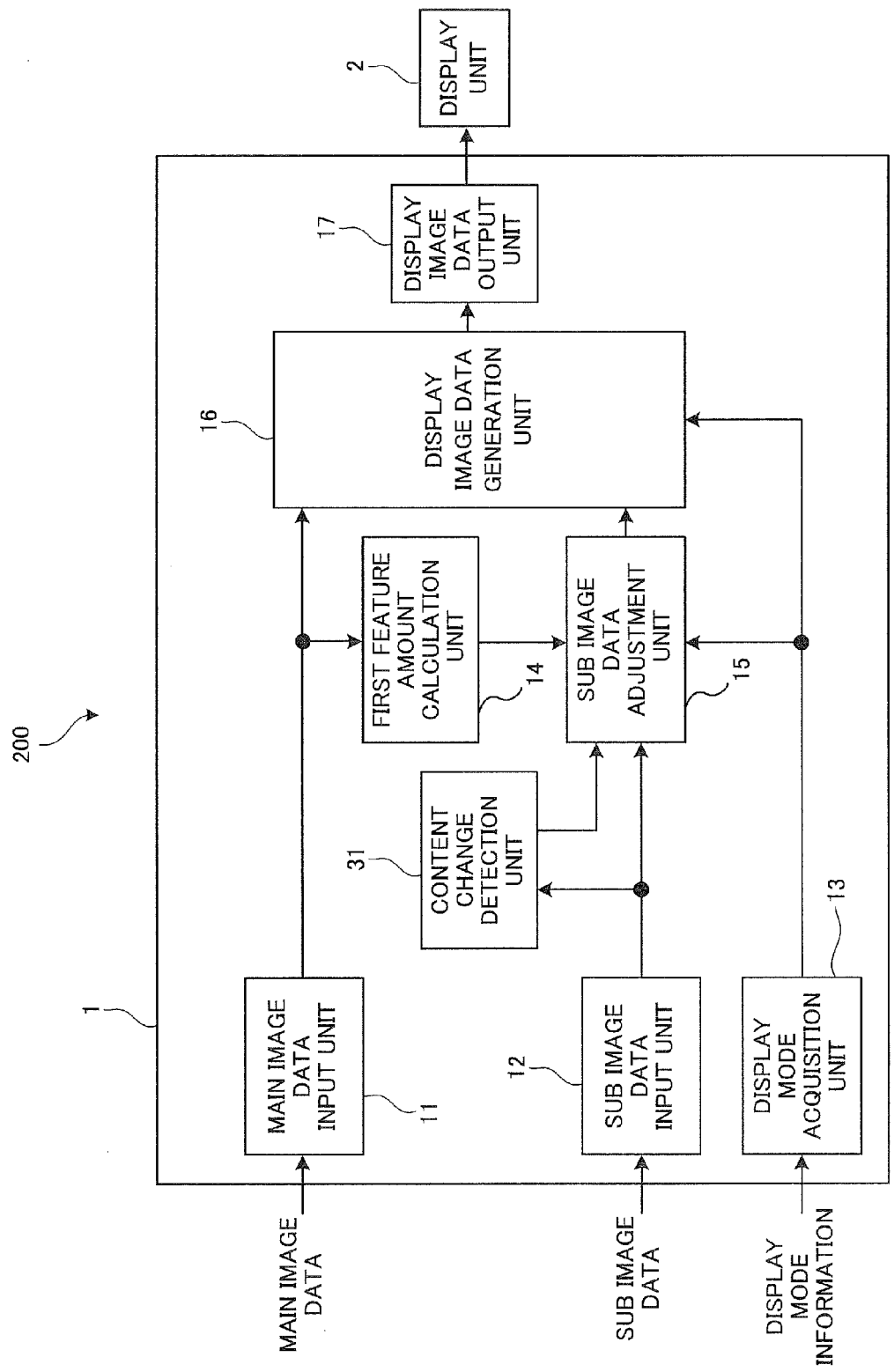
FIG. 10 is a block diagram showing the configuration of a display device according to a second embodiment.

FIG. 10 is a block diagram showing the configuration of the display device 200 according to the second embodiment. In FIG. 10, the display device 200 includes a content change detection unit 31 in addition to the configuration of the display device 100 of FIG. 1. The sub image data input to the sub image data input unit 12 are input to the sub image data adjustment unit 15 and content change detection unit 31.

The content change detection unit 31 detects a timing (referred to below as a 'content change timing') of change of the content item in the sub image data input from the sub image data input unit 12, and outputs the detection result to the sub image data adjustment unit 15. For example, sub image data representing advertisement images consist of plural content items each having a given time length, such as 5, 10, or 15 seconds; the content change detection unit 31 detects content change timings in the sub image data by a method of detecting a scene change based on luminance variation, histogram variation, or the like. As the method of detecting a scene change, a variety of methods including known methods may be used.

For example, the content change detection unit 31 receives the sub image data frame by frame in the display order, and when a scene change has been detected between the current frame and the previous frame, outputs a detection result indicating that a content change timing has been detected, to the sub image data adjustment unit 15.

The sub image data adjustment unit 15 performs, on the sub image data from the sub image data input unit 12, resizing processing in accordance with the display mode information from the display mode acquisition unit 13, image quality adjustment based on the feature amount of the main image data from the first feature amount calculation unit 14, or other processing, to generate adjusted sub image data. In this embodiment, the sub image data adjustment unit 15 controls the feature amount of the main image data used in the image quality adjustment based on the detection result of the content change timing output from the content change detection unit 31.

Figure 11:
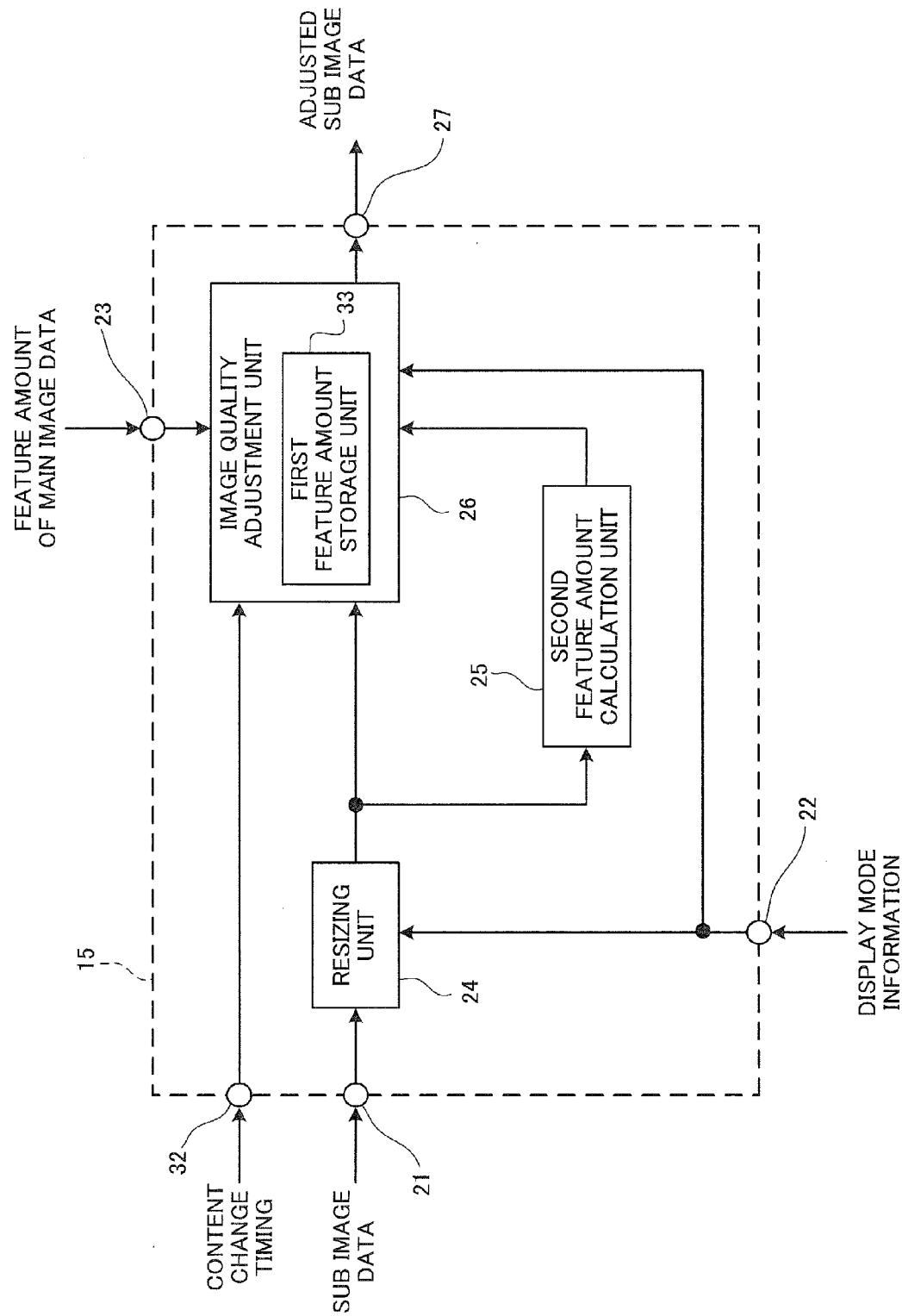
FIG. 11 is a block diagram showing the configuration of a sub image data adjustment unit in the second embodiment.

FIG. 11 is a block diagram showing the configuration of the sub image data adjustment unit 15 in the second embodiment. In FIG. 11, the sub image data adjustment unit 15 includes an input terminal 32 for the content change timing in addition to the configuration of the sub image data adjustment unit 15 in the first embodiment.

The input terminal 32 receives input of the detection result of the content change timing from the content change detection unit 31; the detection result of the content change timing input to the input terminal 32 is input to the image quality adjustment unit 26.

When the image quality adjustment unit 26 performs the image quality adjustment for each content item of the sub image data, it updates (or changes) the feature amount of the main image data used in the image quality adjustment, at the timing of change of the content item of the sub image data subjected to the image quality adjustment. That is, when the image quality adjustment unit 26 performs the image quality adjustment for each content item, it uses, as the feature amount of the main image data used in the image quality adjustment, a constant feature amount on a content item by content item basis. Specifically, the sub image data include image data of plural content items arranged in time series; the image quality adjustment unit 26 performs the image quality adjustment on the image data of the plural content items one by one in order, and updates (or changes) the feature amount of the main image data used in the image quality adjustment, at the timing of change of the content item subjected to the image quality adjustment. While performing the image quality adjustment on one content item, the image quality adjustment unit 26 does not update the feature amount of the main image data used in the image quality adjustment. The order of the image quality adjustment is, for example, a display order (or arrangement order) of the content items, but may be another order.

In the example of FIG. 11, the image quality adjustment unit 26 includes a first feature amount storage unit 33 and temporarily stores the feature amount of the main image data input from the input terminal 23 in the first feature amount storage unit 33. Based on the detection result of the content change timing input from the input terminal 32, the image quality adjustment unit 26 holds the feature amount of the main image data stored in the first feature amount storage unit 33 until the content change timing, and updates the feature amount of the main image data stored in the first feature amount storage unit 33 at the content change timing. Then, the image quality adjustment unit 26 performs the image quality adjustment of the sub image data by using the feature amount of the main image data stored in the first feature amount storage unit 33. Specifically, the image quality adjustment unit 26 determines a setting value for the image quality adjustment based on the feature amount of the main image data stored in the first feature amount storage unit 33 and the feature amount of the sub image data input from the second feature amount calculation unit 25, and performs the image quality adjustment on the resized sub image data in accordance with the setting value.

As the feature amount of the main image data, a feature amount of each frame (e.g., an average value of luminance values or the like of each frame) may be used. However, since the feature amount of the main image data slightly varies in a content item due to partial text change or visual effect, a feature amount of each content item (e.g., an average value of luminance values or the like of each content item) is employed here.

For example, the sub image data are input to the image quality adjustment unit 26 frame by frame in the display order, and in synchronization with the input of a frame of the sub image data, a feature amount of the main image data corresponding to the frame of the sub image data is input to the image quality adjustment unit 26. Here, the feature amount of the main image data corresponding to the frame of the sub image data is a feature amount of a content item to which a frame of the main image data corresponding to the frame of the sub image data belongs (e.g., a luminance average value of the content item). The image quality adjustment unit 26 holds the feature amount of the main image data stored in the first feature amount storage unit 33 until a content change timing is detected, and when a content change timing is detected, updates the feature amount of the main image data stored in the first feature amount storage unit 33 with the feature amount of the main image data corresponding to the leading frame of the content item after the change in the sub image data.

Figure 12:
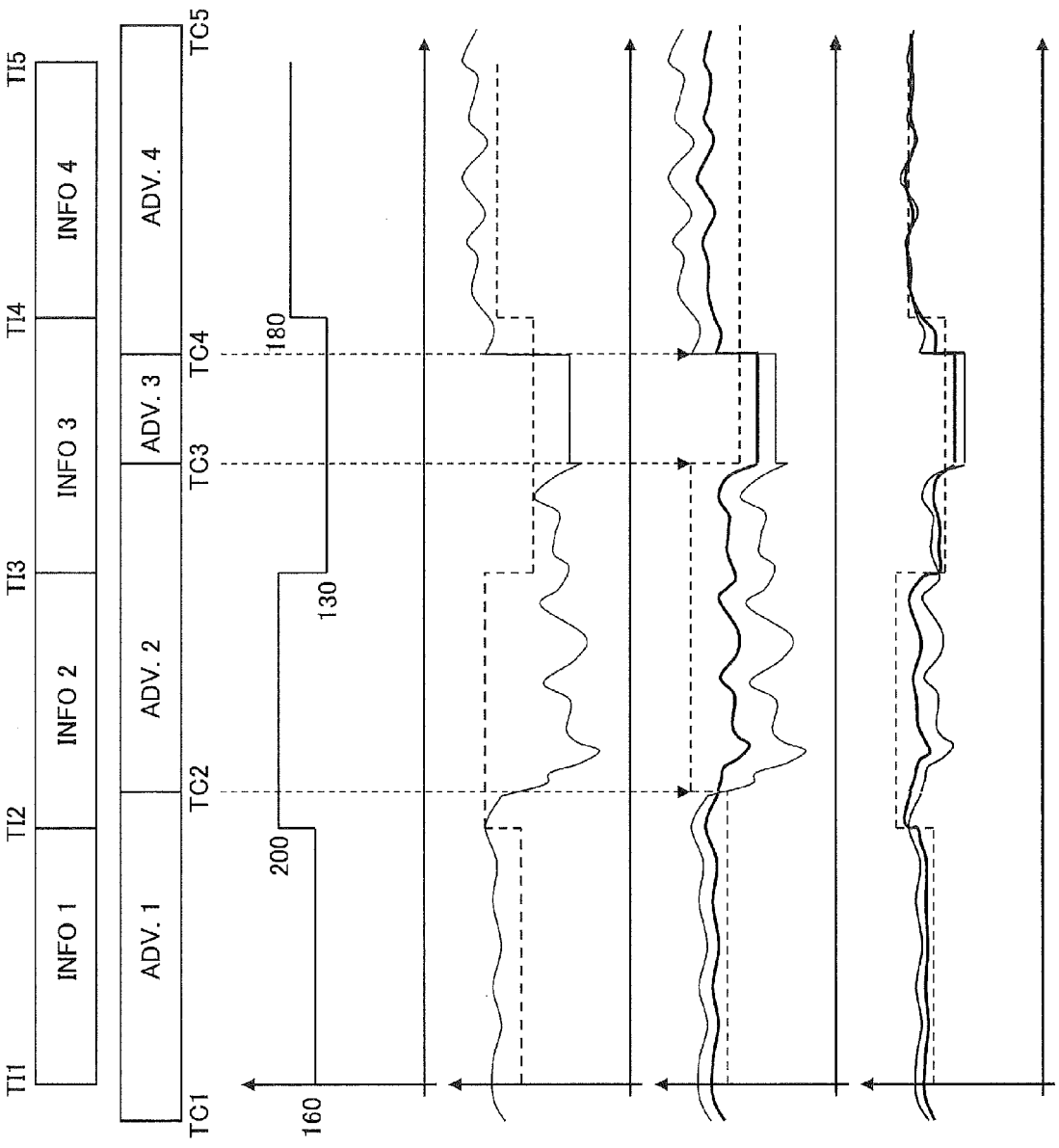
FIGS. 12(a) to 12(f) are drawings for explaining an example of image quality adjustment in the second embodiment.

An example of the image quality adjustment when the display mode is the simultaneous display mode will be described below with reference to FIG. 12. This example uses an average luminance value of each frame as a feature amount.

FIGS. 12(a), 12(b), 12(c), and 12(d) show main image data, sub image data, an average luminance value of the main image data, and an average luminance value of the sub image data, respectively, as in FIGS. 8(a), 8(b), 8(c), and 8(d).

The image quality adjustment unit 26 performs the image quality adjustment on the resized sub image data from the feature amount of the main image data and the feature amount of the sub image data. In FIG. 12(e), the thin solid line represents the average luminance value of the sub image data before the image quality adjustment; the dashed line represents an average luminance value of the main image data used in the image quality adjustment (i.e., an average luminance value of the main image data stored in the first feature amount storage unit 33); the thick solid line represents an average luminance value of the sub image data after the image quality adjustment. As shown in FIG. 12(e), the image quality adjustment unit 26 performs the image quality adjustment of the sub image data so that the average luminance value of the sub image data approaches the average luminance value of the main image data. Specifically, the image quality adjustment unit 26 performs the image quality adjustment on each frame of the sub image data; when performing the image quality adjustment on a frame Fs of the sub image data, it performs the image quality adjustment so that the average luminance value Ls' of the frame Fs after the image quality adjustment is equal to the average value of the average luminance value Ls of the frame Fs before the image quality adjustment and the average luminance value Lm of the main image data corresponding to the frame Fs, that is, an equation of Ls'=(Ls+ Lm)/2 is satisfied. As the average luminance value Lm of the main image data, the average luminance value of the main image data stored in the first feature amount storage unit 33 is used. As shown in FIG. 12, the average luminance value of the main image data stored in the first feature amount storage unit 33 is updated at the content change timings TC2, TC3, and TC4 of the sub image data, and is kept constant during the period of the same content item of the sub image data. Thus, while the average luminance value (dashed line) of the main image data used in the image quality adjustment shown in FIG. 8(e) is equal to the average luminance value of the main image data shown in FIG. 8(c), the average luminance value (dashed line) of the main image data used in the image quality adjustment shown in FIG. 12(e) is an average luminance value obtained by updating (taking in) the average luminance value of the main image data at the content change timings TC2, TC3, and TC4 of the sub image data.

In FIG. 12(f), the thin solid line represents the average luminance value of the sub image data after the image quality adjustment; the dashed line represents the average luminance value of the main image data; the thick solid line represents the average luminance value of display image data in which the sub image data after the image quality adjustment and the main image data are combined.

According to this embodiment described above, in addition to the same advantages as those in the first embodiment, the following advantages are obtained.

In this embodiment, the sub image data include image data of plural content items arranged in time series; when the image quality adjustment unit performs the image quality adjustment for each content item, it updates the feature amount of the main image data used in the image quality adjustment, at the timing of change of the content item. With this configuration, since the feature amount of the main image data used in the image quality adjustment is updated at the time of changeover of the content item of the sub image data, discomfort on the display image due to the change of the feature amount of the main image data used in the image quality adjustment is less compared to a case where the feature amount of the main image data used in the image quality adjustment is changed within a content item.

Third Embodiment

The display device according to the third embodiment is identical to the display device 100 according to the first embodiment except for a portion regarding control in the image quality adjustment as described below. Descriptions of parts that are the same as in the first embodiment will be omitted or simplified in the description below, and the same reference characters will be used for elements that are the same as or correspond to those in the first embodiment.

As shown in FIG. 10, the display device according to this embodiment includes a content change detection unit 31 in addition to the configuration of the display device 100 of FIG. 1, and the sub image data input to the sub image data input unit 12 are input to the sub image data adjustment unit 15 and content change detection unit 31, as in the second embodiment.

The content change detection unit 31 detects a timing (content change timing) of change of the content item in the sub image data input from the sub image data input unit 12, and outputs the detection result to the sub image data adjustment unit 15, as in the second embodiment.

The sub image data adjustment unit 15 performs, on the sub image data from the sub image data input unit 12, resizing processing in accordance with the display mode information from the display mode acquisition unit 13, image quality adjustment based on the feature amount of the main image data from the first feature amount calculation unit 14, or other processing, to generate adjusted sub image data. In this embodiment, the sub image data adjustment unit 15 controls the feature amount of the sub image data used in the image quality adjustment based on the detection result of the content change timing output from the content change detection unit 31.

Figure 13:
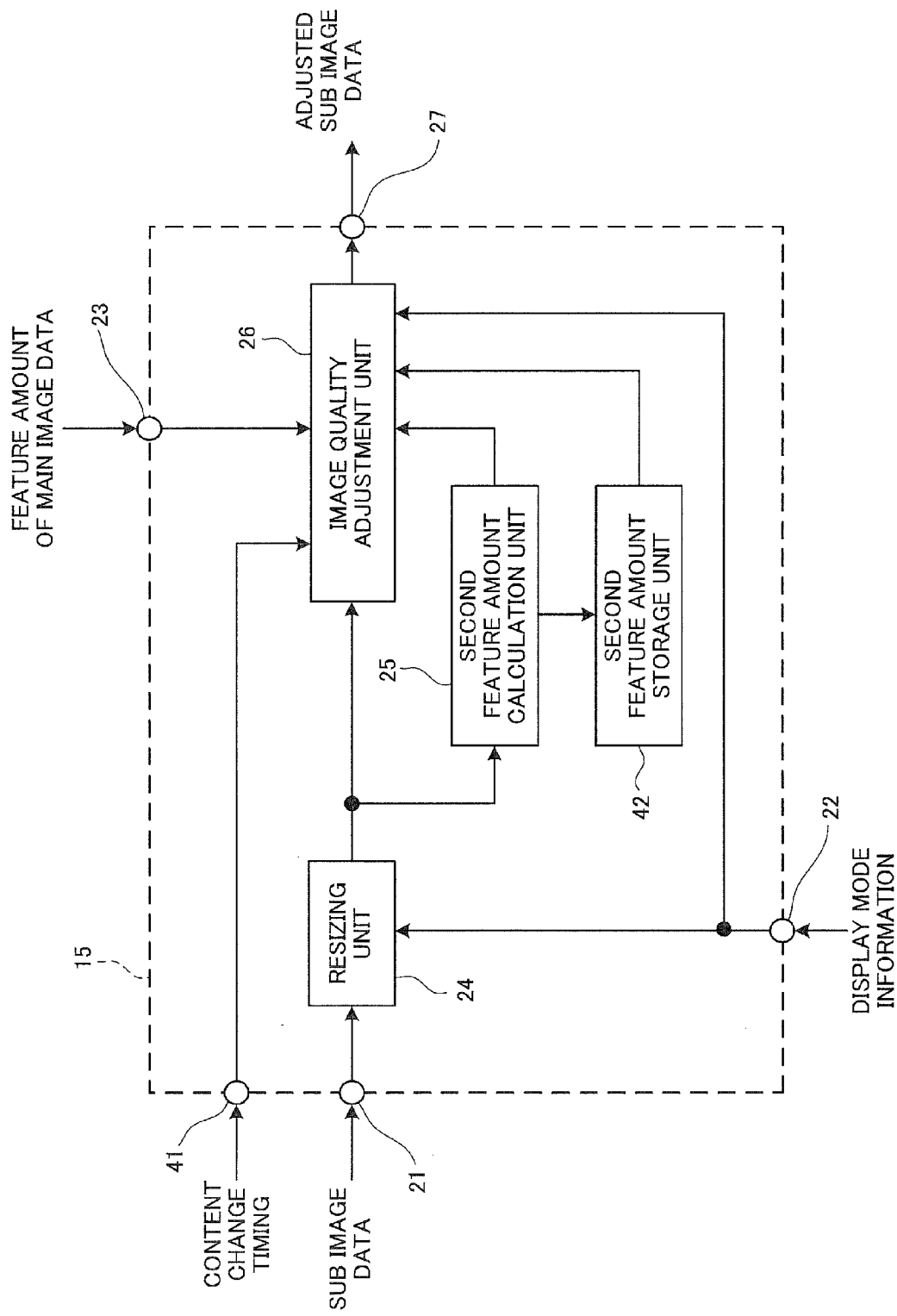
FIG. 13 is a block diagram showing the configuration of a sub image data adjustment unit in a third embodiment.

FIG. 13 is a block diagram showing the configuration of the sub image data adjustment unit 15 in the third embodiment. In FIG. 13, the sub image data adjustment unit 15 includes an input terminal 41 for the content change timing and a second feature amount storage unit 42 in addition to the configuration of the sub image data adjustment unit 15 in the first embodiment shown in FIG. 4.

The input terminal 41 receives input of the detection result of the content change timing from the content change detection unit 31; the detection result of the content change timing input to the input terminal 41 is input to the image quality adjustment unit 26.

The second feature amount calculation unit 25 outputs the calculated feature amount of the sub image data to the image quality adjustment unit 26 and second feature amount storage unit 42.

The second feature amount storage unit 42 temporarily stores the feature amount of the sub image data output from the second feature amount calculation unit 25, and outputs a past feature amount of the sub image data to the image quality adjustment unit 26.

The image quality adjustment unit 26 determines a setting value for the image quality adjustment based on the feature amount of the main image data input from the input terminal 23, the feature amount of the sub image data output from the second feature amount calculation unit 25, and the past feature amount of the sub image data output from the second feature amount storage unit 42, and performs the image quality adjustment on the resized sub image data output from the resizing unit 24 in accordance with the setting value to generate adjusted sub image data.

In this embodiment, in a case where the sub image data include image data of a first content item and image data of a second content item following the first content item, when the image quality adjustment unit 26 performs the image quality adjustment on a portion of the image data of the second content item immediately after the change from the first content item to the second content item, the image quality adjustment unit 26 performs control for reducing variation in the feature amount of the adjusted sub image data before and after the change. Specifically, when the image quality adjustment unit 26 performs the image quality adjustment on the portion immediately after the change, it uses, as the feature amount of the sub image data, a predetermined feature amount between a feature amount calculated from the image data of the first content item and a feature amount calculated from the image data of the second content item. In this case, the image quality adjustment unit 26 may use, as the feature amount of the sub image data, a feature amount that gradually varies from the above predetermined feature amount to a feature amount calculated from the image data of the second content item. The term 'gradually varies' includes a meaning of varying in a step by step or continuous manner along the time axis of the image data of the second content item. For example, when the feature amount of the sub image data used in the image quality adjustment with respect to an nth (n=1, 2, 3, . . . ) frame of the second content item is denoted as Cs(n), Cs(n) takes the above predetermined feature amount when n=1, and changes to the feature amount calculated from the image data of the second content item in a step by step manner as n increases.

The above portion immediately after the change may correspond to, for example, one frame or plural frames. The feature amount calculated from the image data of the first content item is, for example, a feature amount of the first content item, or a feature amount of a frame or frames at an end part of the first content item. The feature amount calculated from the image data of the second content item is, for example, a feature amount of the second content item, or a feature amount of a frame or frames at a leading part of the second content item. The feature amount that gradually varies may finally reach or converge to the feature amount calculated from the image data of the second content item.

In the example of FIG. 13, the image quality adjustment unit 26 determines, based on the detection result of the content change timing input from the input terminal 41, a setting value (e.g., an adjustment level or an adjustment amount) for the image quality adjustment from the feature amount of the sub image data input from the second feature amount calculation unit 25 and the past feature amount of the sub image data output from the second feature amount storage unit 42 so that the adjustment level for the image quality adjustment (or the feature amount of the adjusted sub image data) does not vary greatly before and after the content change timing. Specifically, when performing the image quality adjustment on the content item after the change, the image quality adjustment unit 26 uses, during a period immediately after the change, as the feature amount of the sub image data, a predetermined feature amount between a feature amount of the content item before the change output from the second feature amount storage unit 42 and a feature amount of the content item after the change output from the second feature amount calculation unit 25. For example, when an average luminance value of each content item is used as a feature amount of the sub image data, if the average luminance value of the content item before the change is $L_0$ and the average luminance value of the content item after the change is La, in the image quality adjustment with respect to a frame or frames immediately after the content change, an average luminance value $L_1$ calculated according to the following equation (1) is used as the feature amount of the sub image data instead of the average luminance value La of the content item after the change:

$$L_1 = L_0 + (La - L_0) \times \alpha \, (0 < \alpha < 1) \tag{1}.$$

For example, when it is assumed that $\alpha=0.8$ in the equation (1), if the average luminance value of the content item before the change is 100 and the average luminance value of the content item after the change is 200, in the image quality adjustment with respect to a frame or frames immediately after the content change, a value of 100+(200−100)×0.8=180 is used as the feature amount of the sub image data.

The image quality adjustment unit 26 may use, during the period immediately after the change, as the feature amount of the sub image data, a feature amount that gradually varies from the above predetermined feature amount to a feature amount of the image data of the content item after the change (or a feature amount of the current sub image data). For example, when an average luminance value of each content item is used as a feature amount of the sub image data, if the average luminance value of the content item before the change is $L_0$ and the average luminance value of the content item after the change is La, in the image quality adjustment with respect to an nth (n=1, 2, 3, . . . ) frame immediately after the content change (i.e., an nth frame of the content item after the change), an average luminance value $L_n$ calculated according to the following equation (2) may be used as the feature amount of the sub image data instead of the average luminance value La of the content item after the change:

$$L_n = L_{n-1}(La - L_{n-1}) \times \alpha (0 < a < 1) \qquad (2).$$

For example, when it is assumed that α=0.8 in the equation (2), if the average luminance value of the content item before the change is 100 and the average luminance value of the content item after the change is 200, in the image quality adjustment with respect to the first frame immediately after the content change, a value of 100+(200−100)×0.8=180 is used as the feature amount of the sub image data, and in the image quality adjustment with respect to the next (i.e., second) frame, a value of 180+(200−180)×0.8=196 is used as the feature amount of the sub image data. Thus, the image quality adjustment unit 26 changes the feature amount of the sub image data used in the image quality adjustment with a certain time constant.

According to this embodiment described above, in addition to the same advantages as those in the first embodiment, the following advantages are obtained.

In this embodiment, the sub image data include image data of a first content item and image data of a second content item following the first content item; when the image quality adjustment unit performs the image quality adjustment on a portion of the image data of the second content item immediately after the change from the first content item to the second content item, it performs control for reducing variation in the feature amount of the adjusted sub image data before and after the change. Specifically, when performing the image quality adjustment on the portion immediately after the change, the image quality adjustment unit uses, as the feature amount of the sub image data, a predetermined feature amount between a feature amount calculated from the image data of the first content item and a feature amount calculated from the image data of the second content item. According to this embodiment, it is possible to suppress a rapid change of the display image due to the change of the content item of the sub image data (e.g., a rapid change in the image quality, such as the luminance value, of the sub image in the display image), thereby reducing discomfort due to a rapid change of the display image and improving the visibility of the display image.

Further, in one aspect, when performing the image quality adjustment on the portion immediately after the change, the image quality adjustment unit uses, as the feature amount of the sub image data, a feature amount that gradually varies from the predetermined feature amount to a feature amount calculated from the image data of the second content item. With this aspect, it is possible to gradually shift to an image quality adjustment suitable for the second content item while suppressing a rapid change of the display image due to the change of the content item of the sub image data.

Fourth Embodiment

The display device according to the fourth embodiment is identical to the display device 100 according to the first embodiment except for a portion regarding control of the feature amount used for the image quality adjustment as described below. Descriptions of parts that are the same as in the first embodiment will be omitted or simplified in the description below, and the same reference characters will be used for elements that are the same as or correspond to those in the first embodiment.

Figure 14:
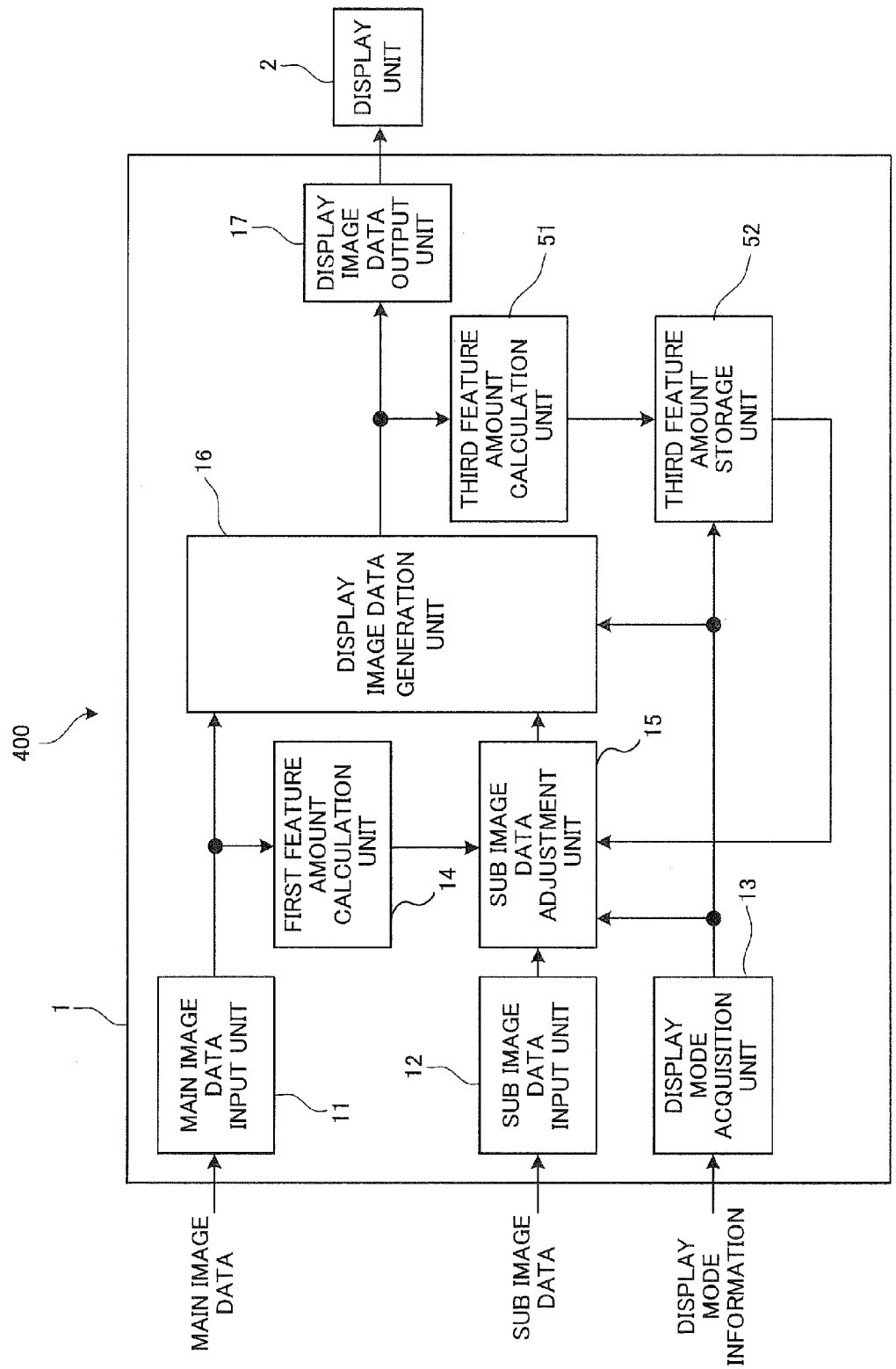
FIG. 14 is a block diagram showing the configuration of a display device according to a fourth embodiment.

FIG. 14 is a block diagram showing the configuration of the display device 400 according to the fourth embodiment. In FIG. 14, the display device 400 includes a third feature amount calculation unit 51 and a third feature amount storage unit 52 in addition to the configuration of the display device 100 of FIG. 1.

The third feature amount calculation unit 51 calculates a feature amount of the display image data generated by the display image data generation unit 16 and outputs it to the third feature amount storage unit 52. Specifically, the feature amount is a feature amount regarding image quality of the display image data and is, for example, an average value (average luminance value), a greatest value (greatest luminance value), a smallest value (smallest luminance value), or a histogram (luminance histogram) of luminance values of the image data of each frame, an average value, a greatest value, a smallest value, or a histogram of gradation values of a predetermined color component or each of the color components of the image data of each frame, or the like. The color components are, for example, RGB components. Specifically, the above average value etc. of luminance values etc. of the image data of each frame is an average value etc. of luminance values etc. of plural pixels constituting the one frame. The feature amount is not limited to a feature amount of each frame; it may be a feature amount obtained by averaging over plural frames (e.g., an average luminance value of each plural frames), or a feature amount obtained by averaging by the content item (e.g., an average luminance value of each content item). The feature amount is not limited to a luminance value or a gradation value; it may be a sharpness, a chroma, or the like.

The third feature amount storage unit 52 stores the feature amount of the display image data calculated by the third feature amount calculation unit 51. The third feature amount storage unit 52 outputs the stored feature amount of the display image data to the sub image data adjustment unit 15, based on the display mode information input from the display mode acquisition unit 13, at the timing at which the display mode shifts from the simultaneous display mode to the sub image display mode.

The sub image data adjustment unit 15 performs, on the sub image data from the sub image data input unit 12, resizing processing in accordance with the display mode information from the display mode acquisition unit 13, image quality adjustment based on the feature amount of the main image data from the first feature amount calculation unit 14, or other processing, to generate adjusted sub image data. In this embodiment, when the display mode shifts from the simultaneous display mode to the sub image display mode, the sub image data adjustment unit 15 performs the image quality adjustment using the feature amount of the display image data output from the third feature amount storage unit 52.

Figure 15:
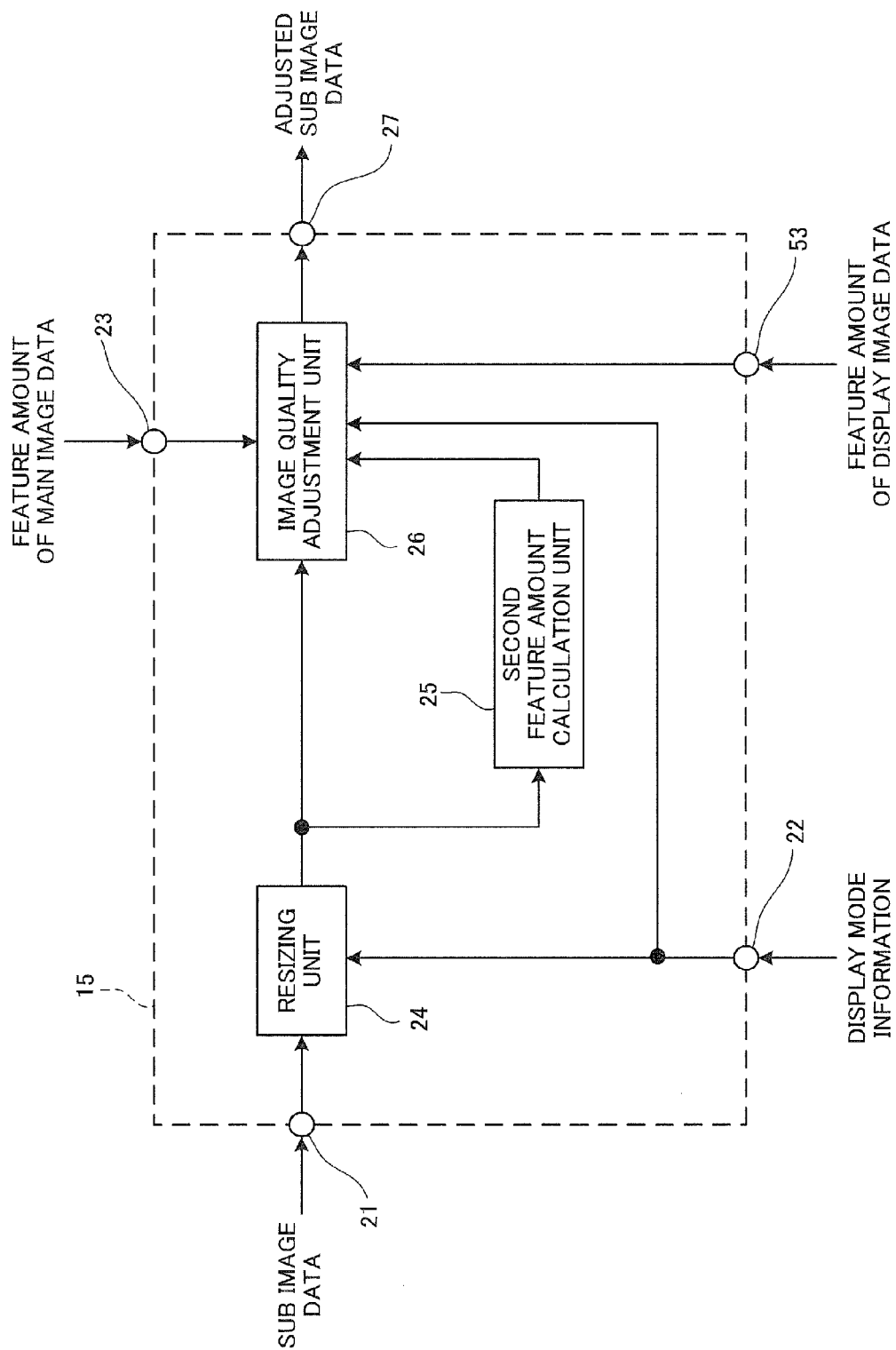
FIG. 15 is a block diagram showing the configuration of a sub image data adjustment unit in the fourth embodiment.

FIG. 15 is a block diagram showing the configuration of the sub image data adjustment unit 15 in the fourth embodiment. In FIG. 15, the sub image data adjustment unit 15 includes an input terminal 53 for the feature amount of the display image data in addition to the configuration of the sub image data adjustment unit 15 in the first embodiment.

The input terminal 53 receives input of the feature amount of the display image data from the third feature amount storage unit 52; the feature amount of the display image data input to the input terminal 53 is input to the image quality adjustment unit 26.

The image quality adjustment unit 26 determines a setting value for the image quality adjustment based on the feature amount of the main image data input from the input terminal 23, the feature amount of the sub image data output from the second feature amount calculation unit 25, and the feature amount of the display image data input from the input terminal 53, and performs the image quality adjustment on the resized sub image data output from the resizing unit 24 in accordance with the setting value to generate adjusted sub image data.

In this embodiment, in the case where the display mode indicated by the display mode information acquired by the display mode acquisition unit 13 shifts from the simultaneous display mode to the sub image display mode, when the image quality adjustment unit 26 performs the image quality adjustment on the sub image data corresponding to the sub image display mode after the shift, at least immediately after the shift, the image quality adjustment unit 26 uses a reference feature amount obtained from the feature amount of the display image data corresponding to the display mode before the shift calculated by the third feature amount calculation unit 51, instead of the feature amount of the main image data. The reference feature amount is, for example, the feature amount of the display image data corresponding to the display mode before the shift. The feature amount of the display image data corresponding to the display mode before the shift is, for example, a feature amount of the display image data in a predetermined period (e.g., a period of one or plural frames) immediately before the shift of the display mode to the sub image display mode.

The reference feature amount may be a feature amount that gradually varies from the feature amount of the display image data corresponding to the display mode before the shift to a preset value. The term 'gradually varies' includes a meaning of varying in a step by step or continuous manner along the time axis of the sub image data. For example, when the reference feature amount used in the image quality adjustment with respect to an nth (n=1, 2, 3, . . . ) frame of the sub image data is denoted as Cr(n), Cr(n) takes the feature amount of the display image data when n=1, and changes to the preset value in a step by step manner as n increases. The feature amount that gradually varies may finally reach or converge to the preset value. The preset value is a value set corresponding to the sub image display mode and is, for example, set so that good visibility of the sub image is obtained in the sub image display mode.

In the above configuration, the image quality adjustment unit 26 may determine the above value in accordance with an ambient environment of the display unit 2 that displays the display image data and, for example, may determine the above value based on at least one of illuminance of the display unit 2 and brightness of a backlight of the display unit 2. Specifically, the image quality adjustment unit 26 may obtain illuminance around the display unit 2 from an illuminance detection unit (not shown), obtain brightness of the backlight of the display unit 2 from a backlight control unit (not shown), and determine the above value based on the obtained ambient illuminance and backlight brightness.

In cases other than the above, such as in a case where the display mode is the simultaneous display mode or main image display mode, the image quality adjustment unit 26 performs the image quality adjustment as in the first embodiment.

The process of the image processing unit 1 when the display mode shifts from the simultaneous display mode to the sub image display mode will be specifically described below.

The feature amount of the display image data in the simultaneous display mode is calculated by the third feature amount calculation unit 51 and stored in the third feature amount storage unit 52. The feature amount of the display image data is, for example, the average luminance value shown in FIG. 8(f) or 12(f). When the display mode shifts to the sub image display mode, information indicating the shift is input from the display mode acquisition unit 13 to the third feature amount storage unit 52, and the feature amount of the display image data stored in the third feature amount storage unit 52 is output to the sub image data adjustment unit 15.

In the sub image data adjustment unit 15, the image quality adjustment unit 26 receives input of the feature amount of the display image data from the third feature amount storage unit 52 through the input terminal 53, and performs the image quality adjustment of the sub image data using the input feature amount of the display image data as a reference, instead of using the feature amount of the main image data as the reference. In this case, the image quality adjustment unit 26 may perform the image quality adjustment with the feature amount of the display image data in the combination display mode as the reference immediately after the shift, and then may converge the feature amount used as the reference for the image quality adjustment to a preset value gradually over time.

The image processing unit 1 may perform the same process as above when the display mode shifts from the main image display mode to the sub image display mode.

According to this embodiment described above, in addition to the same advantages as those in the first embodiment, the following advantages are obtained.

In this embodiment, the image processing unit further includes the third feature amount calculation unit that calculates a feature amount of the display image data; in a case where the display mode indicated by the display mode information shifts from the simultaneous display mode or main image display mode to the sub image display mode, when the image quality adjustment unit performs the image quality adjustment on the sub image data corresponding to the sub image display mode after the shift, it uses the feature amount of the display image data corresponding to the display mode before the shift calculated by the third feature amount calculation unit, instead of the feature amount of the main image data. That is, in a case where the display mode indicated by the display mode information shifts from the simultaneous display mode or main image display mode to the sub image display mode, when the image quality adjustment unit performs the image quality adjustment on the sub image data corresponding to the sub image display mode after the shift, it performs the image quality adjustment so that a difference between a feature amount of the adjusted sub image data and the feature amount of the display image data corresponding to the display mode before the shift calculated by the third feature amount calculation unit is smaller than a difference between the feature amount of the sub image data calculated by the second feature amount calculation unit and the feature amount of the display image data. With this configuration, in a case where the display mode shifts from the simultaneous display mode or main image display mode to the sub image display mode, by reducing the difference between the feature amount of the display image data before the shift and the feature amount of the display image data after the shift (adjusted sub image data), it is possible to reduce the change in the feature amount, such as the luminance, of the display image at the time of display mode shift, improving the visibility of the image. Specifically, in a case where the display mode shifts from the simultaneous display mode to the sub image display mode, when the luminance of the sub image in the sub image display mode is lower or higher than the luminance of the entire picture in the simultaneous display mode, by reducing the luminance difference (luminance change) at the time of the shift, it is possible to improve the visibility when they are viewed temporally continuously.

Further, in one aspect, when the image quality adjustment unit performs the image quality adjustment on the sub image data corresponding to the sub image display mode after the shift, it uses a feature amount that gradually varies from the feature amount of the display image data corresponding to the display mode before the shift to a preset value, instead of the feature amount of the main image data. With this aspect, it is possible to gradually shift to an image quality adjustment suitable for the sub image display mode while suppressing the change in the feature amount of the display image data at the time of display mode shift, enabling display with less discomfort.

Further, in one aspect, the image quality adjustment unit determines the above value in accordance with the ambient environment, such as the ambient illuminance or backlight brightness, of the display unit. With this aspect, it is possible to perform an image quality adjustment appropriate for the ambient environment of the display unit.

In the fourth embodiment, the first feature amount calculation unit 14 may be omitted, and the image quality adjustment based on the feature amount of the main image data calculated by the first feature amount calculation unit 14 may be omitted. For example, the image quality adjustment with respect to the sub image data in the simultaneous display mode or main image display mode may be omitted, and the image processing unit 1 may be configured to perform the image quality adjustment only on the sub image data corresponding to the sub image display mode after the shift.

Fifth Embodiment

The display device according to the fifth embodiment is identical to the display device 100 according to the first embodiment except for a portion regarding correction of the main image data as described below. Descriptions of parts that are the same as in the first embodiment will be omitted or simplified in the description below, and the same reference characters will be used for elements that are the same as or correspond to those in the first embodiment.

Figure 16:
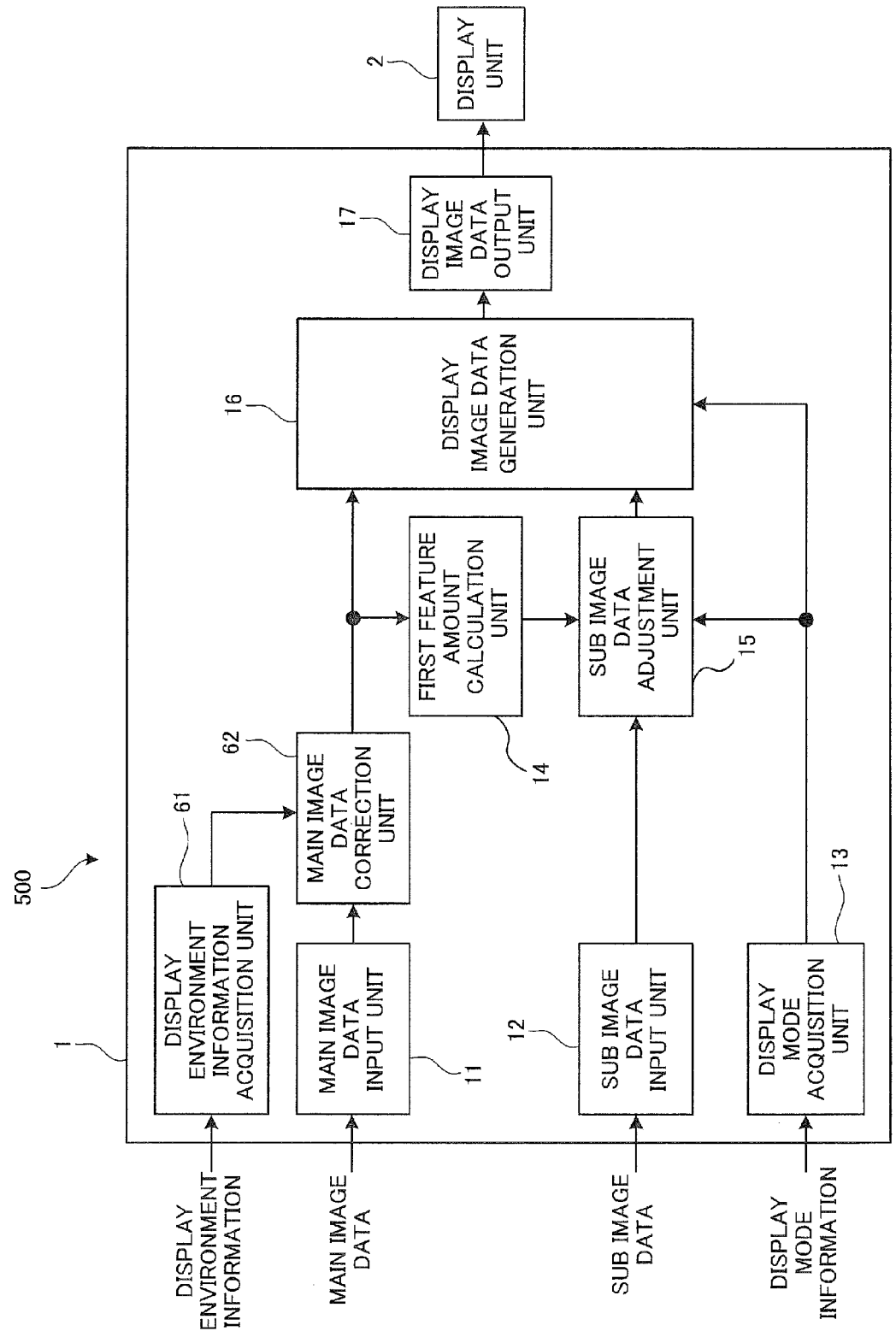
FIG. 16 is a block diagram showing the configuration of a display device according to a fifth embodiment.

FIG. 16 is a block diagram showing the configuration of the display device 500 according to the fifth embodiment. In FIG. 16, the display device 500 includes a display environment information acquisition unit 61 and a main image data correction unit 62 in addition to the configuration of the display device 100 of FIG. 1.

The display environment information acquisition unit 61 acquires display environment information that is information regarding an ambient environment of the display unit 2 that displays the display image data. The display environment information is, for example, illuminance information indicating the ambient illuminance of the display unit 2, or brightness information indicating the brightness of backlight or the like radiated to the display unit 2. Here, the display environment information acquisition unit 61 is an input terminal that receives input of display environment information, and receives illuminance information from an illuminance detection unit (not shown) and brightness information from a backlight control unit (not shown).

The main image data correction unit 62 corrects the main image data input from the main image data input unit 11 in response to the ambient environment of the display unit 2 based on the display environment information acquired by the display environment information acquisition unit 61. Specifically, when the ambient illuminance of the display unit 2 is low, the main image data correction unit 62 performs the correction so as to lower the average luminance of the main image data; in contrast, when the ambient illuminance of the display unit 2 is high, it performs the correction so as to raise the average luminance of the main image data. When the brightness of the backlight is lowered for power saving or other purposes, the main image data correction unit 62 may perform the correction so as to raise the luminance of the main image data to compensate it.

The main image data corrected by the main image data correction unit 62 are input to the first feature amount calculation unit 14 and display image data generation unit 16. The first feature amount calculation unit 14 and display image data generation unit 16 use the main image data corrected by the main image data correction unit 62, instead of the main image data input to the main image data input unit 11.

According to this embodiment described above, in addition to the same advantages as those in the first embodiment, the following advantages are obtained.

In this embodiment, the image processing unit further includes the main image data correction unit that corrects the main image data in response to the ambient environment of the display unit; the first feature amount calculation unit and display image data generation unit use the main image data corrected by the main image data correction unit, instead of the main image data input to the main image data input unit. With this configuration, it is possible to display the main image data appropriately in response to the ambient environment of the display unit. Further, for example, in some cases, it is desirable to correct, in response to the ambient environment of the display device, the main image data for information display or the like prepared for the display device; by performing an appropriate correction on the main image data in advance, it is possible to perform the subsequent adjustment of the sub image data appropriately.

In the first to fifth embodiments described above, the functions of the image processing unit may be implemented purely by electronic circuits and other hardware resources, or by cooperation of hardware resources and software. In the latter case, the functions of the image processing unit are implemented by, for example, execution of an image processing program by a computer. More specifically, an image processing program stored in a storage medium such as a ROM (Read Only Memory) is read into a main memory and executed by a CPU (Central Processing Unit), and thereby the functions of the image processing unit are implemented. The image processing program may be stored in and supplied from a computer-readable storage medium such as an optical disc, or may be supplied through a communication line such as the Internet.

The present invention is not limited to the embodiments described above; it can be practiced in various other aspects without departing from the inventive scope.

For example, although the description in each embodiment described above mainly uses an average luminance value as a feature amount, this is not mandatory. Even when another feature amount, such as a greatest luminance value, a smallest luminance value, or an average value, a greatest value, or a smallest value of gradation values of each color component, is used, the same advantages are obtained.

Further, in each embodiment described above, the image quality adjustment unit 26 may perform the image quality adjustment using a set value corresponding to the display mode indicated by the display mode information acquired by the display mode acquisition unit 13, instead of the feature amount of the main image data. That is, the image quality adjustment unit 26 may perform the image quality adjustment so that the feature amount of the sub image data approaches a set value corresponding to each display mode.

Further, in each embodiment described above, the image processing unit 1 may acquire resized sub image data obtained by resizing sub image data in accordance with display mode information, from an external source, instead of resizing the sub image data in the resizing unit 24. In this case, the resizing unit 24 may be omitted.

Further, the configurations of the respective embodiments may be combined with each other appropriately. For example, the third embodiment may be combined with the second embodiment; the fourth embodiment may be combined with the second or third embodiment; the fifth embodiment may be combined with the second, third, or fourth embodiment.

REFERENCE CHARACTERS

1 image processing unit, 2 display unit, 11 main image data input unit, 12 sub image data input unit, 13 display mode acquisition unit, 14 first feature amount calculation unit, 15 sub image data adjustment unit, 16 display image data generation unit, 17 display image data output unit, 24 resizing unit, 25 second feature amount calculation unit, 26 image quality adjustment unit, 31 content change detection unit, 33 first feature amount storage unit, 42 second feature amount storage unit, 51 third feature amount calculation unit, 52 third feature amount storage unit, 61 display environment information acquisition unit, 62 main image data correction unit, 100, 200, 400, 500 display device.

What is claimed is:

1. An image processing device for generating display image data for displaying a main image and a sub image simultaneously or in a switching manner, the image processing device comprising:
    an input terminal configured to
        receive main image data representing the main image;
        receive sub image data representing the sub image;
        acquire display mode information indicating a display mode for displaying the main image, the sub image, or both the main image and the sub image; and
    a processor configured to
        calculate a first feature amount representing a feature amount of the received main image data;
        calculate a second feature amount representing a feature amount of the received sub image data or resized sub image data obtained by resizing the received sub image data in accordance with the acquired display mode information;
        generate adjusted sub image data by adjusting image quality of the resized sub image data so that a difference between a feature amount of the adjusted sub image data and the first feature amount of the received main image data is smaller than a difference between the second feature amount of the received sub image data and the first feature amount of the received main image data; and
        generate the display image data from the received main image data and the adjusted sub image data, in accordance with the acquired display mode information, wherein
    the sub image data include image data of a plurality of content items arranged in time series, and when the image quality adjustment is performed for each of the plurality of content items, the processor updates the first feature amount of the received main image data used in the image quality adjustment, at the timing of change of the content item subjected to the image quality adjustment.

2. The image processing device of claim 1, wherein:
    the main image data are image data of a graphic image or a text image; and
    the sub image data are image data of a natural image or an animation image.

3. The image processing device of claim 1, wherein:
    the sub image data include image data of a first content item and image data of a second content item following the first content item; and
    when performing the image quality adjustment on a portion of the image data of the second content item immediately after the change from the first content item to the second content item, the processor performs control for reducing variation in the feature amount of the adjusted sub image data before and after the change.

4. The image processing device of claim 3, wherein when performing the image quality adjustment on the portion immediately after the change, the processor uses, as the feature amount of the sub image data, a predetermined feature amount between a feature amount calculated from the image data of the first content item and a feature amount calculated from the image data of the second content item.

5. The image processing device of claim 4, wherein when performing the image quality adjustment on the portion immediately after the change, the processor uses, as the feature amount of the sub image data, a feature amount that gradually varies from the predetermined feature amount to a feature amount calculated from the image data of the second content item.

6. The image processing device of claim 1, wherein the processor is further configured to
    calculate a third feature amount representing a feature amount of the generated display image data, wherein
    in a case where the display mode indicated by the acquired display mode information shifts from a simultaneous display mode in which the main image and the sub image are displayed simultaneously or a main image display mode in which only the main image is displayed to a sub image display mode in which only the sub image is displayed, when the processor performs the image quality adjustment on the received sub image data corresponding to the sub image display mode after the shift, the processor uses the third feature amount of the display image data calculated before the display mode shift, instead of the first feature amount of the main image data.

7. The image processing device of claim 6, wherein when performing the image quality adjustment on the sub image data corresponding to the sub image display mode after the shift, the processor uses a feature amount that gradually varies from the third feature amount of the display image data calculated before the display mode shift to a preset value, instead of the first feature amount of the received main image data.

8. The image processing device of claim 7, wherein the preset value is determined in accordance with an ambient environment of a display unit that displays an image based on the display image data.

9. The image processing device of claim 1, wherein the processor uses a set value corresponding to the display mode indicated by the acquired display mode information instead of the first feature amount of the main image data.

10. The image processing device of claim 1, wherein each of the feature amounts includes at least one of an average value, a greatest value, a smallest value, and a histogram of luminance values of each frame of each image data and an average value, a greatest value, a smallest value, and a histogram of gradation values of a predetermined color component of each frame of each image data.

11. The image processing device of claim 1, wherein the processor is further configured to
correct the received main image data in accordance with an ambient environment of a display unit that displays an image based on the display image data, wherein
the processor uses the corrected main image data instead of the received main image data.

12. An image processing device for generating display image data for displaying a main image and a sub image simultaneously or in a switching manner, the image processing device comprising:
an input terminal configured to
receive main image data representing the main image;
receive sub image data representing the sub image;
acquire display mode information indicating a display mode for displaying the main image, the sub image, or both the main image and the sub image; and
a processor configured to
a calculate a first feature amount representing a feature amount of the received sub image data or of resized sub image data obtained by resizing the received sub image data in accordance with the acquired display mode information;
generate adjusted sub image data by adjusting image quality of the resized sub image data;
generate the display image data from the received main image data and the adjusted sub image data, in accordance with the acquired display mode information; and
calculate a second feature amount representing a feature amount of the generated display image data, wherein
in a case where the display mode indicated by the acquired display mode information shifts from a simultaneous display mode in which the main image and the sub image are displayed simultaneously or a main image display mode in which only the main image is displayed to a sub image display mode in which only the sub image is displayed, when the processor performs the image quality adjustment on the sub image data corresponding to the sub image display mode after the shift, the processor performs the image quality adjustment so that a difference between a feature amount of the adjusted sub image data and a reference feature amount is smaller than a difference between the calculated first feature amount of the sub image data and the reference feature amount; and
the reference feature amount is a feature amount that gradually varies from the calculated second feature amount of the display image data, obtained from a feature amount of the display image data corresponding to the display mode before the shift, to a preset value.

13. A display device comprising:
the image processing device of claim 1; and
a display unit that displays an image based on the generated display image data.

14. An image processing method for generating display image data for displaying a main image and a sub image simultaneously or in a switching manner, the image processing method comprising:
receiving main image data representing the main image;
receiving sub image data representing the sub image;
acquiring display mode information indicating a display mode for displaying the main image, the sub image, or both the main image and the sub image;
calculating a first feature amount representing a feature amount of the received main image data;
calculating a second feature amount representing a feature amount of the received sub image data or resized sub image data obtained by resizing the received sub image data in accordance with the acquired display mode information;
generating adjusted sub image data by adjusting image quality of the resized sub image data so that a difference between a feature amount of the adjusted sub image data and the first feature amount of the received main image data is smaller than a difference between the second feature amount of the received sub image data and the first feature amount of the received main image data; and
generating the display image data from the received main image data and the adjusted sub image data, in accordance with the acquired display mode information, wherein
the sub image data include image data of a plurality of content items arranged in time series, and when the image quality adjustment is performed for each of the content items, the first feature amount of the received main image data used in the image quality adjustment is updated, at the timing of change of the content item subjected to the image quality adjustment.

15. The image processing method of claim 14, wherein:
the main image data are image data of a graphic image or a text image; and
the sub image data are image data of a natural image or an animation image.

16. An image processing method for generating display image data for displaying a main image and a sub image simultaneously or in a switching manner, the image processing method comprising:
receiving main image data representing the main image;
receiving sub image data representing the sub image;
acquiring display mode information indicating a display mode for displaying the main image, the sub image, or both the main image and the sub image;
calculating a first feature amount representing a feature amount of the received sub image data or resized sub image data obtained by resizing the received sub image data in accordance with the acquired display mode information;
generating adjusted sub image data by adjusting image quality of the resized sub image data;
generating the display image data from the received main image data and the generated adjusted sub image data, in accordance with the acquired display mode information; and calculating a second feature amount representing a feature amount of the generated display image data; wherein in a case where the display mode indicated by the acquired display mode information shifts from a simultaneous display mode in which the main image and the sub image are displayed simultaneously or a main image display mode in which only the main image is displayed to a sub image display mode in which only the sub image is displayed, when the image quality adjustment is performed on the sub image data corresponding to the sub image display mode after the shift, the image quality adjustment is performed so that a difference between a feature amount of the adjusted sub image data and a reference feature amount is smaller than a difference between the calculated first feature amount of the sub image data and the reference feature amount; and the reference feature amount is a feature amount that gradually varies from the calculated second feature amount of the display image data, obtained from a feature amount of the display image data corresponding to the display mode before the shift, to a preset value.

17. A display method comprising:

the image processing method of claim 14; and a display step for displaying an image based on the generated display image data.

18. A non-transitory computer-readable storage medium storing an image processing program for generating display image data for displaying a main image and a sub image simultaneously or in a switching manner, the image processing program causing a computer to execute:

receiving main image data representing the main image;

receiving sub image data representing the sub image;

acquiring display mode information indicating a display mode for displaying the main image, the sub image, or both the main image and the sub image;

calculating a first feature amount representing a feature amount of the received main image data;

calculating a second feature amount representing a feature amount of the received sub image data or resized sub image data obtained by resizing the received sub image data in accordance with the acquired display mode information;

generating adjusted sub image date by adjusting image quality of the resized sub image data so that a difference between a feature amount of the adjusted sub image data and the first feature amount of the main image data is smaller than a difference between the second feature amount of the received sub image data and the first feature amount of the received main image data; and generating the display image data from the received main image data and the generated adjusted sub image data, in accordance with the acquired display mode information; wherein the sub image data include image data of a plurality of content items arranged in time series, and when the image quality adjustment is performed for each of the content items, the first feature amount of the received main image data used in the image quality adjustment is updated, at the timing of change of the content item subjected to the image quality adjustment.

19. A non-transitory computer-readable storage medium storing an image processing program for generating display image data for displaying a main image and a sub image simultaneously or in a switching manner, the image processing program causing a computer to execute:

receiving main image data representing the main image;

receiving sub image data representing the sub image;

acquiring display mode information indicating a display mode for displaying the main image, the sub image, or both the main image and the sub image;

calculating a first feature amount representing a feature amount of the received sub image data or resized sub image data obtained by resizing the received sub image data in accordance with the acquired display mode information;

generating adjusted sub image data by adjusting image quality of the resized sub image data;

generating the display image data from the received main image data and the generated adjusted sub image data, in accordance with the acquired display mode information; and calculating a second feature amount representing a feature amount of the generated display image data; wherein in a case where the display mode indicated by the acquired display mode information shifts from a simultaneous display mode in which the main image and the sub image are displayed simultaneously or a main image display mode in which only the main image is displayed to a sub image display mode in which only the sub image is displayed, when the image quality adjustment is performed on the sub image data corresponding to the sub image display mode after the shift, the image quality adjustment is performed so that a difference between a feature amount of the adjusted sub image data and a reference feature amount is smaller than a difference between the calculated first feature amount of the sub image data and the reference feature amount; and the reference feature amount is a feature amount that gradually varies from the calculated second feature amount of the display image data, obtained from a feature amount of the display image data corresponding to the display mode before the shift, to a preset value.

* * * * *